(12) United States Patent
Cserna et al.

(10) Patent No.: US 12,050,468 B2
(45) Date of Patent: *Jul. 30, 2024

(54) METHODS AND SYSTEMS FOR AGENT PRIORITIZATION

(71) Applicant: Motional AD LLC, Boston, MA (US)

(72) Inventors: Bence Cserna, Boston, MA (US);
Juraj Kabzan, Boston, MA (US);
Kevin C. Gall, Boston, MA (US);
Thomas Kølbæk Jespersen, Singapore (SG); Gianmarco Alessandro Bernasconi, Boston, MA (US);
Henggang Cui, Boston, MA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,456

(22) Filed: Jan. 27, 2023

(65) Prior Publication Data

US 2023/0195129 A1 Jun. 22, 2023

Related U.S. Application Data

(63) Continuation of application No. 17/553,857, filed on Dec. 17, 2021, now Pat. No. 11,675,362.

(51) Int. Cl.
*G05D 1/00* (2024.01)
(52) U.S. Cl.
CPC ......... *G05D 1/0221* (2013.01); *G05D 1/0011* (2013.01); *G05D 1/0088* (2013.01); *G05D 1/0276* (2013.01)

(58) Field of Classification Search
CPC .......................... G05D 1/0221; G05D 1/0276
See application file for complete search history.

(56) References Cited

U.S. PATENT DOCUMENTS

| | | | | |
|---|---|---|---|---|
| 8,706,298 | B2* | 4/2014 | Goulding | G06N 3/008 700/251 |
| 8,861,842 | B2* | 10/2014 | Jung | G06V 20/58 382/155 |
| 9,092,985 | B2* | 7/2015 | Richardson | G08G 1/166 |
| 9,248,834 | B1* | 2/2016 | Ferguson | B60W 50/0097 |
| 9,581,997 | B1* | 2/2017 | Penilla | G06Q 10/20 |
| 9,612,123 | B1* | 4/2017 | Levinson | G05D 1/6987 |
| 10,059,334 | B1* | 8/2018 | Zhu | B60W 50/0097 |
| 10,131,052 | B1* | 11/2018 | Ibarz Gabardos | G05D 1/0088 |

(Continued)

FOREIGN PATENT DOCUMENTS

KR 10-2018-0058606 A 6/2018

OTHER PUBLICATIONS

Great Britain Office Action issued for Application No. GB 2200725.6, dated Jul. 13, 2022.

(Continued)

*Primary Examiner* — Luis A Martinez Borrero
(74) *Attorney, Agent, or Firm* — Knobbe, Martens, Olson & Bear, LLP

(57) ABSTRACT

Provided are methods for agent prioritization, which can include determining a primary agent set and generating, based on the primary agent set, a trajectory for the autonomous vehicle. Some methods described also include determining an interaction parameter of agents in the environment. Systems and computer program products are also provided.

30 Claims, 12 Drawing Sheets

(56) References Cited

U.S. PATENT DOCUMENTS

| | | | |
|---|---|---|---|
| 10,169,680 B1* | 1/2019 | Sachdeva | G06V 20/653 |
| 10,733,460 B2* | 8/2020 | Heck | G06V 20/58 |
| 10,739,777 B2* | 8/2020 | Refaat | G06V 20/54 |
| 10,852,746 B2* | 12/2020 | Silver | B60W 30/18172 |
| 10,928,820 B1* | 2/2021 | Tao | B60W 60/00276 |
| 10,955,855 B1* | 3/2021 | Tran | G05D 1/0246 |
| 11,003,189 B2* | 5/2021 | Refaat | G05D 1/0088 |
| 11,034,348 B2* | 6/2021 | Ding | B60W 60/001 |
| 11,048,253 B2* | 6/2021 | Ding | G05D 1/0214 |
| 11,150,660 B1* | 10/2021 | Kabirzadeh | G06F 30/15 |
| 11,157,010 B1* | 10/2021 | Narang | G05D 1/0219 |
| 11,161,501 B2* | 11/2021 | Zidek | B60W 30/0956 |
| 11,163,820 B1* | 11/2021 | Morris | G06F 16/532 |
| 11,169,536 B2* | 11/2021 | Halder | G05D 1/0088 |
| 11,181,926 B2* | 11/2021 | Shalev-Shwartz | G01C 21/3492 |
| 11,203,362 B1* | 12/2021 | Beijbom | B60W 60/0011 |
| 11,231,715 B2* | 1/2022 | Tahir | G01S 13/56 |
| 11,237,572 B2* | 2/2022 | Ryll | B64C 39/024 |
| 11,243,532 B1* | 2/2022 | Levihn | G06N 3/08 |
| 11,403,853 B2* | 8/2022 | Murveit | G01S 7/417 |
| 11,415,997 B1* | 8/2022 | Dolan | G06F 11/3688 |
| 11,494,533 B2* | 11/2022 | Liu | G06F 11/3684 |
| 11,526,721 B1* | 12/2022 | O'Malley | G06F 30/15 |
| 11,527,073 B2* | 12/2022 | Choi | G06T 7/20 |
| 11,673,550 B2* | 6/2023 | Ding | B60W 60/001 701/23 |
| 11,675,362 B1* | 6/2023 | Cserna | G05D 1/0011 701/23 |
| 2006/0165811 A1* | 7/2006 | Black | A61B 5/4041 424/570 |
| 2008/0161986 A1* | 7/2008 | Breed | G01S 19/51 701/23 |
| 2010/0104199 A1* | 4/2010 | Zhang | G08G 1/166 382/199 |
| 2010/0106356 A1* | 4/2010 | Trepagnier | G01S 17/86 701/25 |
| 2012/0070034 A1* | 3/2012 | Xiao | G06T 7/254 382/103 |
| 2013/0054106 A1* | 2/2013 | Schmudderich | G01S 13/931 701/1 |
| 2014/0140353 A1* | 5/2014 | Stahlin | H04L 45/3065 370/419 |
| 2014/0156806 A1* | 6/2014 | Karpistsenko | G06Q 10/06 709/219 |
| 2015/0286219 A1* | 10/2015 | Reichel | G08G 1/163 701/23 |
| 2016/0082953 A1* | 3/2016 | Teller | B60W 30/08 701/23 |
| 2017/0248963 A1* | 8/2017 | Levinson | G05D 1/0038 |
| 2018/0032078 A1* | 2/2018 | Ferguson | G06V 20/58 |
| 2018/0046920 A1* | 2/2018 | Yang | G06N 3/044 |
| 2018/0143646 A1 | 5/2018 | Suk et al. | |
| 2018/0194349 A1* | 7/2018 | McGill, Jr. | B60W 60/0013 |
| 2018/0276485 A1* | 9/2018 | Heck | G06N 7/01 |
| 2018/0299275 A1* | 10/2018 | Fong | G05D 1/0246 |
| 2018/0342157 A1* | 11/2018 | Donnelly | G08G 1/205 |
| 2019/0066409 A1* | 2/2019 | Moreira da Mota | G07C 5/0808 |
| 2019/0138029 A1* | 5/2019 | Ryll | G05D 1/0055 |
| 2019/0152490 A1* | 5/2019 | Lan | G06V 20/58 |
| 2019/0163193 A1* | 5/2019 | Lingg | G01C 21/3878 |
| 2019/0179979 A1* | 6/2019 | Melick | G06F 30/367 |
| 2019/0196480 A1* | 6/2019 | Taylor | G05D 1/0223 |
| 2019/0235499 A1* | 8/2019 | Kazemi | B62D 15/025 |
| 2019/0258737 A1* | 8/2019 | Wang | G06F 16/287 |
| 2020/0057453 A1* | 2/2020 | Laws | G05D 1/0295 |
| 2020/0156632 A1* | 5/2020 | Ding | B60W 30/0956 |
| 2020/0159215 A1* | 5/2020 | Ding | G05D 1/0214 |
| 2020/0159232 A1* | 5/2020 | Refaat | G08G 1/0129 |
| 2020/0307561 A1* | 10/2020 | Bush | B60W 60/0016 |
| 2020/0334473 A1* | 10/2020 | Heck | G01C 21/3461 |
| 2020/0410062 A1* | 12/2020 | O'Malley | G06F 30/20 |
| 2020/0410063 A1* | 12/2020 | O'Malley | G06F 11/3058 |
| 2021/0064044 A1 | 3/2021 | Refaat et al. | |
| 2021/0180958 A1* | 6/2021 | Juang | G06V 20/17 |
| 2021/0200221 A1* | 7/2021 | Omari | G06N 7/01 |
| 2021/0269023 A1* | 9/2021 | Ding | B60W 30/0956 |
| 2021/0300412 A1* | 9/2021 | Dingli | B60W 50/0098 |
| 2021/0354690 A1* | 11/2021 | Yershov | G01S 17/931 |
| 2022/0027193 A1* | 1/2022 | Guney | G06F 9/5094 |
| 2022/0043446 A1* | 2/2022 | Ding | G06N 3/08 |
| 2022/0057803 A1* | 2/2022 | Sorin | G05D 1/0088 |
| 2022/0058217 A1* | 2/2022 | Morris | G06F 16/5866 |
| 2022/0187847 A1* | 6/2022 | Cella | G06Q 50/40 |
| 2022/0197306 A1* | 6/2022 | Cella | G06N 3/088 |
| 2022/0234575 A1* | 7/2022 | Kabzan | B60W 60/0013 |
| 2022/0234614 A1* | 7/2022 | Frazzoli | B60W 30/143 |
| 2022/0234618 A1* | 7/2022 | Kabzan | B60W 60/0013 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Korean Office Action issued for Application No. KR 10-2022-0014939, dated Dec. 28, 2023.

* cited by examiner

METHODS AND SYSTEMS FOR AGENT PRIORITIZATION

CROSS-REFERENCE TO RELATED APPLICATIONS

The present application is a continuation of U.S. patent application Ser. No. 17/553,857 filed on Dec. 17, 2021, entitled "METHODS AND SYSTEMS FOR AGENT PRIORITIZATION," which is herein incorporated by reference in its entirety.

TECHNICAL FIELD

The present disclosure relates generally to methods and systems for operating an autonomous vehicle.

BACKGROUND

Autonomous vehicles can use a number of methods and systems for determining a trajectory for the autonomous vehicle. However, these methods and systems can require high computational power, which can lead to inefficient computation. Further, the methods and systems can slow the reaction time of the autonomous vehicle, which can lead to real-world complications.

DETAILED DESCRIPTION

Figure 1:
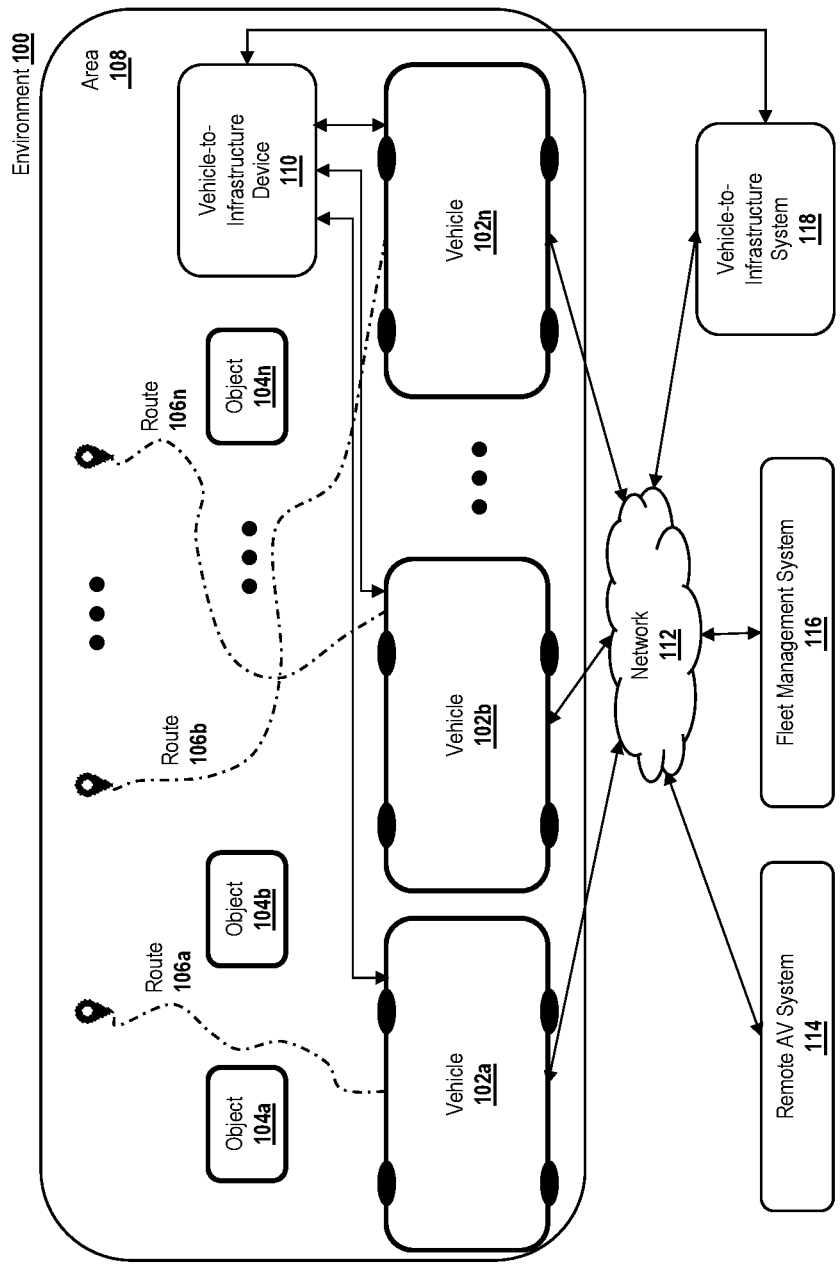
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," ad/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above.

Some embodiments of the present disclosure are described herein in connection with a threshold. As described herein, satisfying or meeting a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method for operating an autonomous vehicle. Specifically, described herein are systems, methods, and computer program products for agent prioritization by using one or more interaction parameters predicative of interaction of the autonomous vehicle with a plurality of agents located in an environment that the autonomous vehicle is located in. Advantageously, the systems, methods, and computer program products described herein can apply prioritization and/or filtration.

By virtue of the implementation of systems, methods, and computer program products described herein, techniques for agent prioritization can improve computational efficiency, such as for providing trajectories for the autonomous vehicle. For example, the systems, methods, and computer program products described herein can lead to reduced computational times and/or modified computational fidelity. This may be advantageous for real-time operation of the autonomous vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
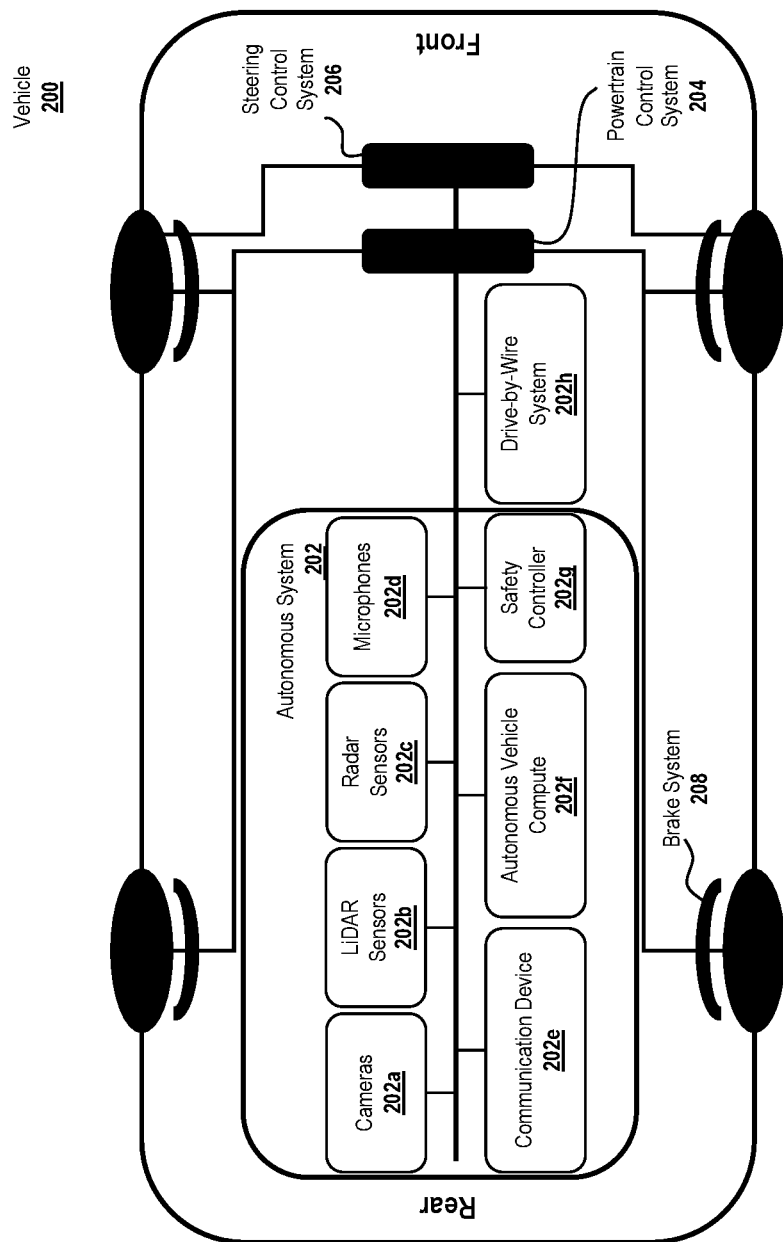
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and safety controller 202*g*.

Figure 3:
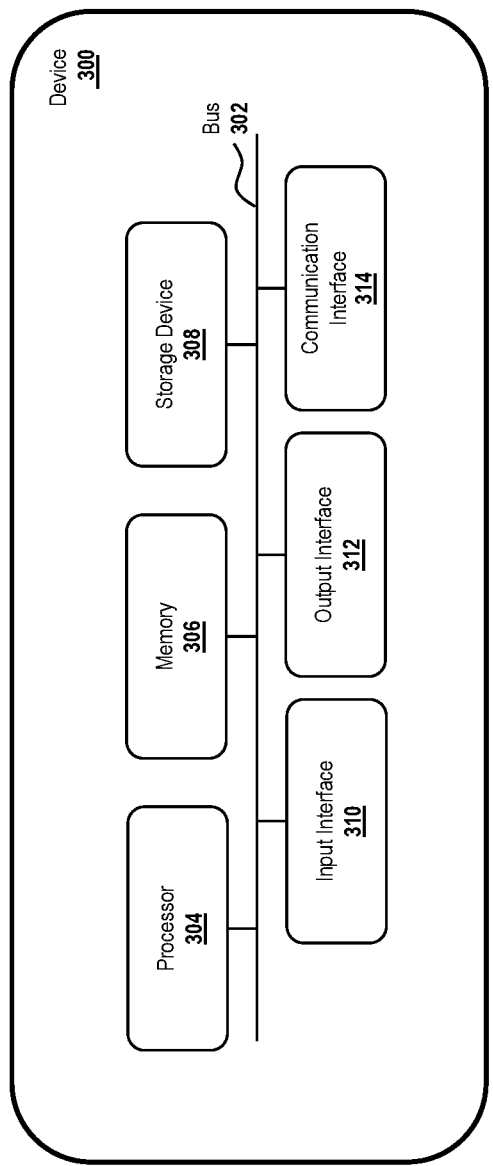
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102), such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
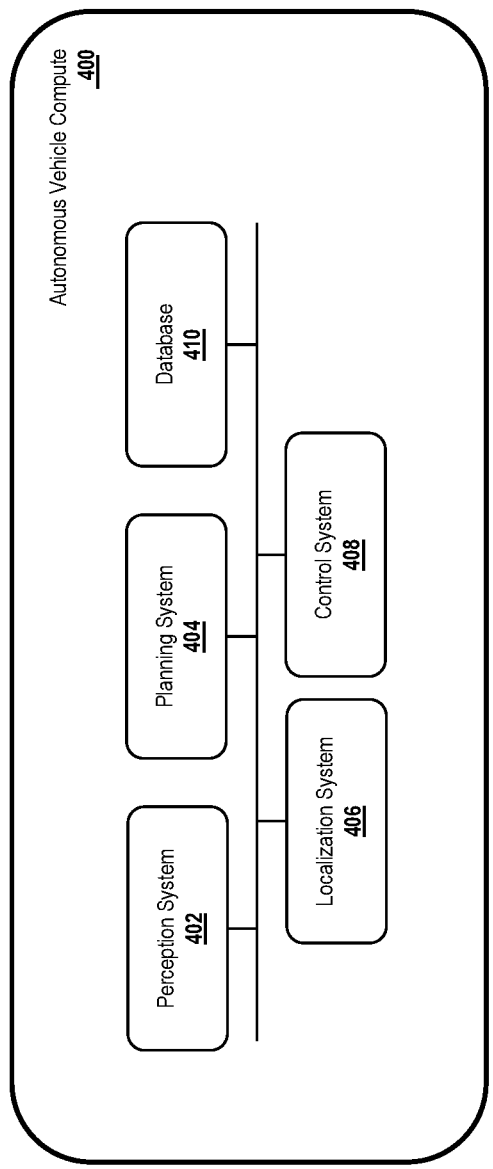
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
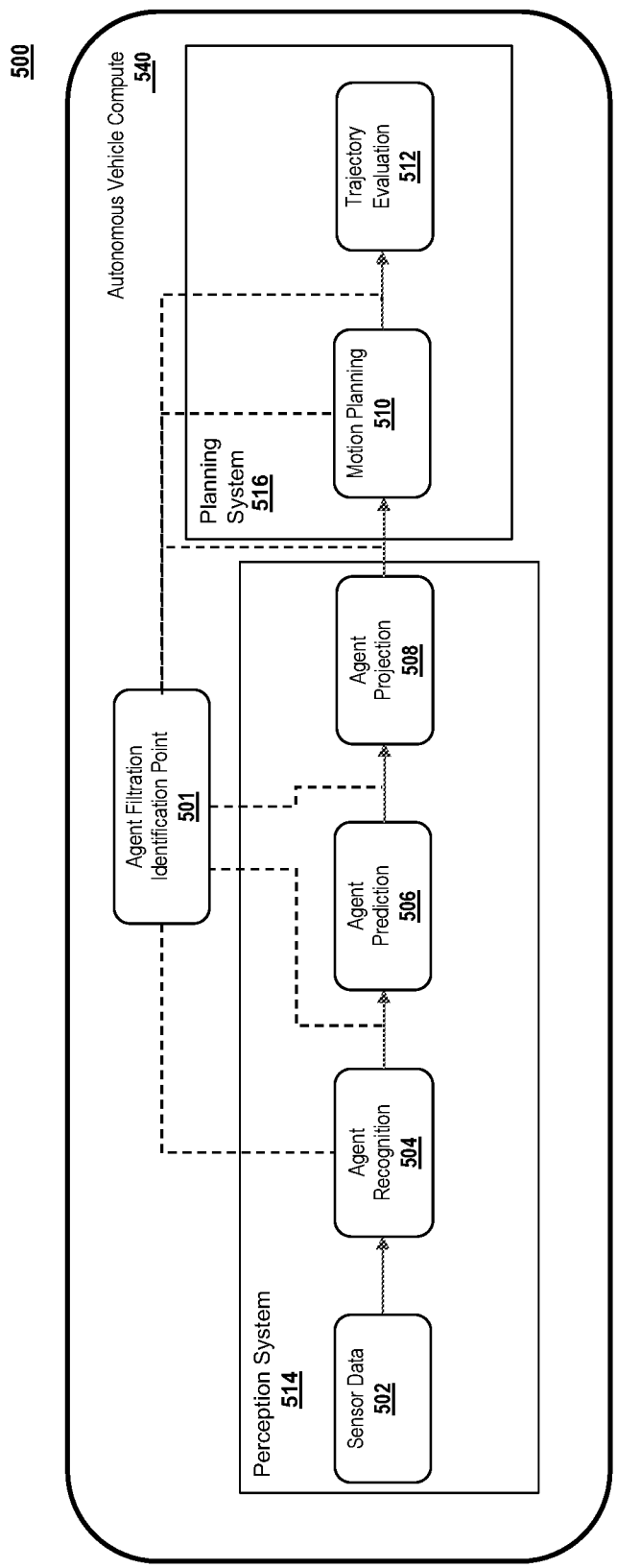
FIGS. 5A-5C are diagrams of an implementation of an example process for agent prioritization.
Figure 5B:
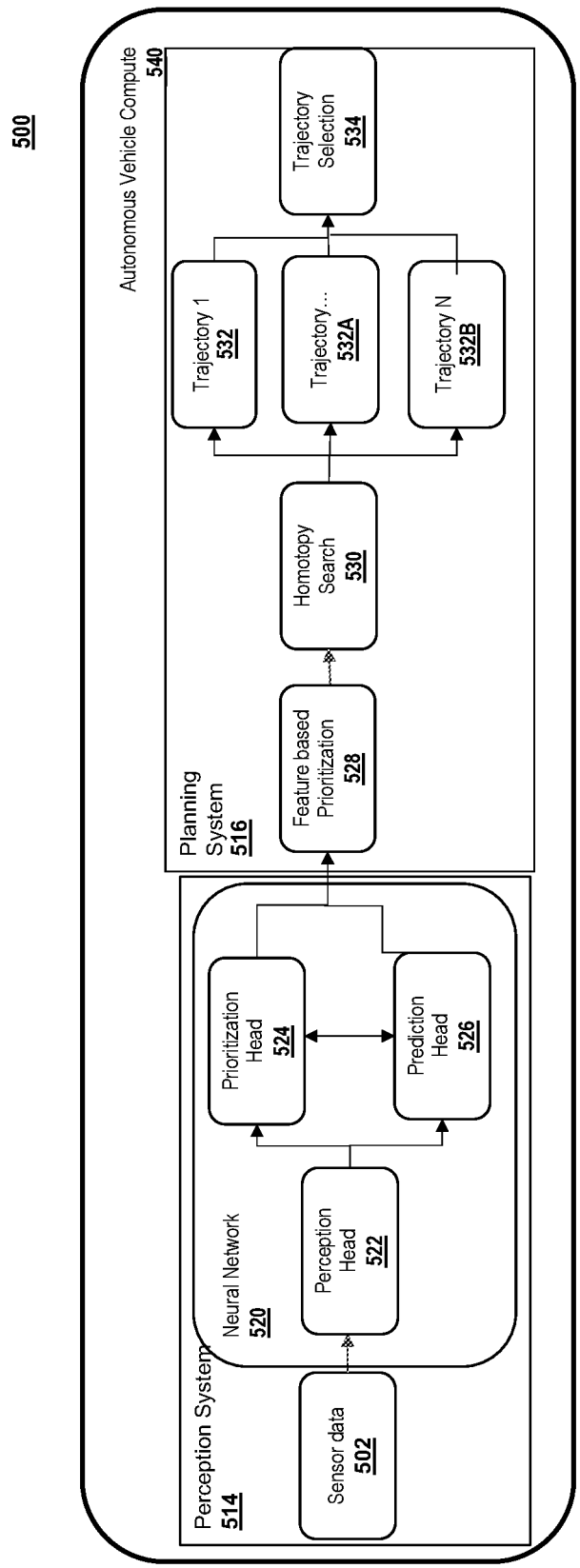
Figure 5C:
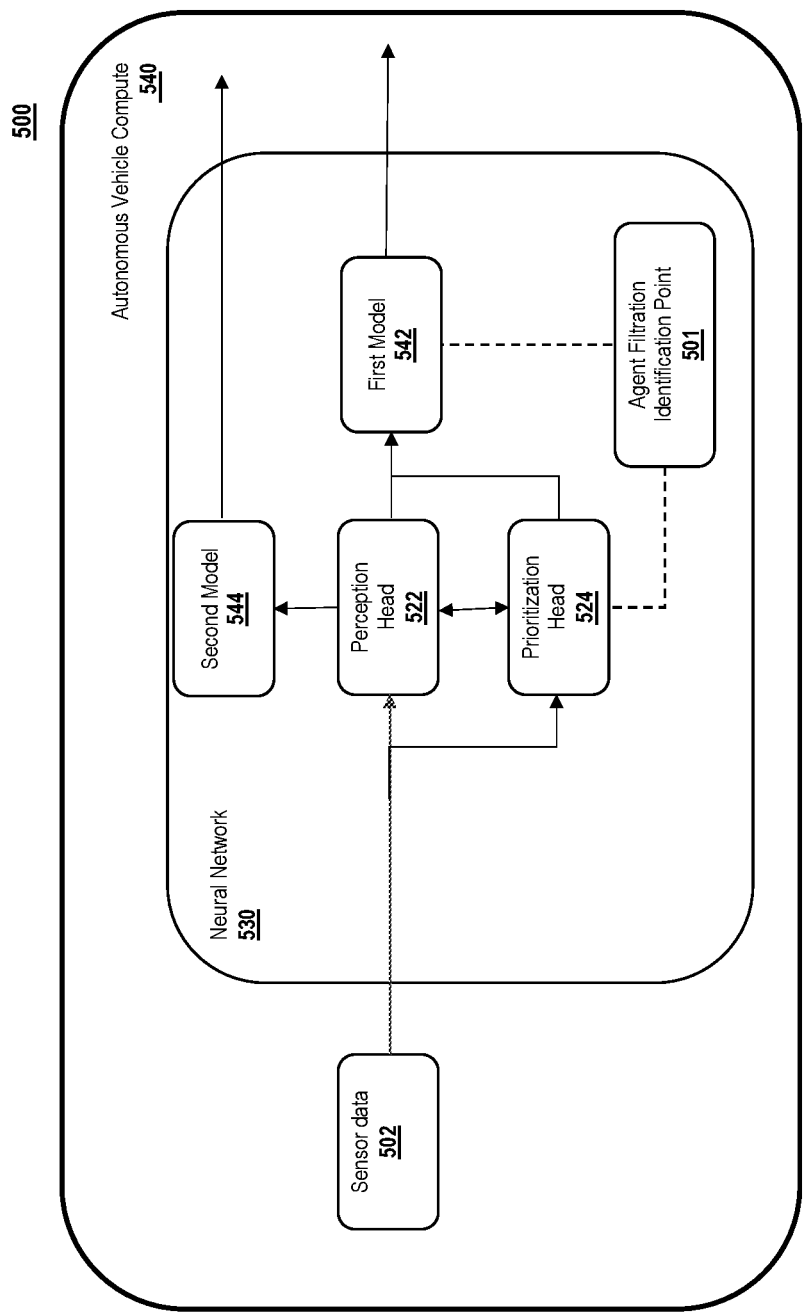

Referring now to FIGS. 5A-5C, illustrated are diagrams of one or more implementations 500 of a process for agent prioritization, and/or agent filtering, e.g. for determining an autonomous vehicle trajectory. In some embodiments, implementation 500 includes an AV compute 540, and a vehicle 502 (similar to vehicle 200 of FIG. 2, such as an autonomous vehicle). In some embodiments, system 500 is the same as or like system, such as a remote AV system, a fleet management system, a V2I system.

Advantageously, autonomous vehicles, systems, methods, and computer program products are disclosed that can perform agent filtration and/or prioritization, such as for motion prediction and planning of trajectories. For example, agents can be filtered and/or prioritized in the processing pipeline (such as via the AV compute 540). For example, agents can be filtered and/or prioritized based on their determined importance, as well as other features. The importance of a particular agent can be due to a possible interaction with the autonomous vehicle. Low-fidelity techniques can be applied to agents with a lower importance. This can allow for important agents to benefit from high fidelity techniques, which can be more computationally expensive. As will be detailed below, to identify the importance of an agent, one or more various techniques can be used, to determine an interaction parameter indicative of a prediction of interaction of a corresponding agent with the autonomous vehicle. Examples of such techniques comprise one or more of: homotopy extraction, Euclidean distance reachability, road infrastructure reachability, and geometric collision. For further computational efficiency, agents can be clustered. The filtering and/or prioritization techniques can be used at any stage of the processing pipeline: agent recognition, agent prediction, agent projection, motion planning, etc. For example, the filtering and/or prioritization techniques can be used for prediction and/or motion planning.

Advantageously, the disclosure can improve the computational efficiency of the agent processing pipeline involved in providing trajectories for the autonomous vehicle. For example, the disclosure can lead to reduced computational times for the current stack, such as due to having less agents to process. Filtration can reduce the number of agents to be processed. Prioritization can enable algorithms with reduced fidelity, hence faster, to be used on less important agents. New type of algorithms available may only be run on the most important agents. Since this method allows using higher fidelity and more computationally expensive models on just the most important agents, the autonomous vehicle can be made more aggressive and reactive. The overall computational load can be reduced as well.

For example, a task of motion planning of an autonomous vehicle can be to find a lawful and/or comfortable trajectory based on one or more agents within the environment. Even though a large number of agents may be present, only a smaller subset of the agents may be impactful to a trajectory of the autonomous vehicle. As the processing of agents is a computationally intensive operation, and the available resources are limited, it may be advantageous to determine a subset of agents, for example based on a prioritization of agents and/or a filtering of agents.

For example, some agents can be discarded, such as filtered out, once there is a determination that the agent is not likely to impact the trajectory of the autonomous vehicle, such as in a meaningful way. Processing these "unimportant" agents can take a significant amount of time. Alternatively, or in conjunction with filtering, the priority of the agent can be considered as well. By prioritizing agents, one or more of lower resolution models can be used, lower numerical accuracy can be need, faster predictors and/or networks can be used, and fewer and/or limited numbers of iterations in iterative algorithms may be used.

FIG. 5A illustrates a portion of a system illustrating a processing pipeline, such as of AV compute 540, which can be used for an autonomous vehicle, specifically including, in some examples, the perception system 514 and the planning system 516. The perception system 514 and the planning system 516 can be similar to those discussed in FIG. 4.

In one or more example systems, the system can include at least one processor. In one or more example systems, the system can include at least one memory storing instructions thereon that, when executed by the at least one processor, cause the at least one processor to obtain sensor data. The sensor data can be associated with an environment in which the autonomous vehicle is operating. In one or more example systems, the system can include at least one memory storing instructions thereon that, when executed by the at least one processor, cause the at least one processor to determine an agent set. The at least one processor can determine the agent set based on the sensor data. The agent set can include a plurality of agents located in the environment. In one or more example systems, the system can include at least one memory storing instructions thereon that, when executed by the at least one processor, cause the at least one processor to determine an interaction parameter. The at least one processor can determine an interaction parameter for each agent of the agent set. The interaction parameter can be indicative of a prediction of an interaction of the corresponding agent with the autonomous vehicle. For example, when the agent comprises at least one agent, the interaction parameter can be indicative of a prediction of an interaction between the at least one agent and the autonomous vehicle. In one or more example systems, the system can include at least one memory storing instructions thereon that, when executed by the at least one processor, cause the at least one processor to determine a primary agent set. The at least one processor can determine the primary agent set based on the interaction parameters. The primary agent set can be a subset of the agent set. In one or more example systems, the system can include at least one memory storing instructions thereon that, when executed by the at least one processor, cause the at least one processor to generate a trajectory of the autonomous vehicle. The at least one processor can generate a trajectory of the autonomous vehicle based on the primary agent set.

The at least one processor can be a processor of a sensor. The at least one processor can be a processor of an AV compute 540. The at least one processor can be a processor of an autonomous vehicle.

As shown in FIG. 5A, the perception system 402 can obtain, such as receive, sensor data 502. The sensor data 502 can be received from one or more sensors associated with the autonomous vehicle. The autonomous vehicle may include one or more sensors, for example, configured to provide the sensor data 502. The one or more sensors can be configured to detect a plurality of agents in an environment of the autonomous vehicle. The sensor data 502 can be, for example, one or more of: infrared data, LIDAR data, motion data, and picture data. The sensor data 502 can be associated with an environment in which an autonomous vehicle is operating. The sensors can be any and/or all of the sensors discussed above. While there is no limit to the dimensions of the environment, the environment may be anywhere that the autonomous vehicle can acquire sensor data in. This can include sensor attached with the autonomous vehicle, or data received from sensors external to the vehicle.

The sensor data 502 may be used for agent recognition 504, such as an agent recognition scheme. For example, the at least one processor can determine, based on the sensor data 502, an agent set including a plurality of agents located in the environment. The agent set can include one or more agents located in the environment.

An agent may be seen as any item or object that can be perceived in the environment of the autonomous vehicle. In some examples, an agent may be anything capable of dynamic movement over time. In some examples, an agent may be anything that can be viewed as: perceiving its environment through sensors and/or acting upon that environment through actuators.

Agents can be all physical objects located in the environment. Agents can be some physical objects located in the environment. The type of agent can be set by a system or a user. The type of agent can be determined automatically, such as through machine learning. Example agents include, but are not limited to, other vehicles, pedestrians, bikers, road obstructions, signs, and intersections. In one or more example systems, an agent of the plurality of agents can include an object capable of a dynamic movement over time. An agent can be any object that is captured by a sensor, or included in a sensor data. For example, a road user and/or road equipment can be an agent.

An agent can be determined via one or more criteria. Example criteria include movement, anticipated movement, and acceleration. An agent can be stored in a database. An agent can be determined via machine learning. An agent can be determined via a neural network model.

The agent set can include data relevant to the particular agent. The agent set can include data associated with the particular agent, for example via an agent identifier identifying the agent. The agent set can be a database. The agent set can be a table. The agent set can be ordered. The agent set can be disordered. The agent set can be a list of agents, such as a list of agent identifiers. The agent set can include 0 agents. The agent set can include at least one agent. In other words, the system can determine, based on the sensor data, an agent set including at least one agent. The agent set can include a plurality of agents.

For one or more agents of the agent set, agent prediction 506, such as an agent prediction scheme, can be performed. For each agent of the agent set, agent prediction 506, such as an agent prediction scheme, can be performed. The agent prediction 506 can predict, such as based on a probability, an action of an agent. Example actions are movement, speed, direction, and acceleration. For example, the agent prediction 506 can include determining an interaction parameter indicative of a prediction of the corresponding agent with the autonomous vehicle. The interaction parameter may be a probability of interaction. The interaction parameter may be indicative of dimensions of an agent, such as speed and/or direction.

The interaction parameter may be indicative of interaction of the corresponding agent for the trajectory of the autonomous vehicle, e.g., due to potential interaction, potential conflict, potential collision. For example, the interaction parameter may indicate a potential future interaction of the corresponding agent with the autonomous vehicle, such as a predicted interaction, such as a probability of the agent interacting with the autonomous vehicle. For example, the interaction parameter may indicate prediction of a level of interaction of the corresponding agent interacting with the autonomous vehicle.

Further, for one or more (such as for each) agent of the agent set, agent projection 508, such as an agent projection scheme, can be performed. While the agent prediction 506 may predict where an agent is likely to go (such as will go), the agent projection 508 may actually project where the agent is likely to go (such as will go). The interaction parameter can be determined via the agent prediction 506 and/or the agent projection.

In one or more example systems, to determine, by the at least one processor, for each agent of the agent set, an interaction parameter indicative of a prediction of interaction of the corresponding agent with the autonomous vehicle can include to predict an interaction of the corresponding agent with the autonomous vehicle. In one or more example systems, to determine, by the at least one processor, for each agent of the agent set, an interaction parameter indicative of a prediction of interaction of the corresponding agent with the autonomous vehicle can include to determine the interaction parameter based on the prediction.

For example, the agent prediction 506 may predict the interaction parameter of the corresponding agent with the autonomous vehicle. The interaction parameter may be indicative of an interaction.

An interaction can be a physical interaction between an agent and the autonomous vehicle. An interaction can be with the autonomous vehicle itself. An interaction can be with an area around the autonomous vehicle. For example, the autonomous vehicle may have a defined boundary around the autonomous vehicle.

In one or more example systems, to predict the interaction parameter of the corresponding agent with the autonomous vehicle, such as during the agent prediction 506 and/or the agent projection 508, can include to determine, for each agent, one or more homotopy parameters. The one or more homotopy parameters can be indicative of a constraint applied by the agent on a trajectory of the autonomous vehicle. In one or more example systems, to predict the interaction of the corresponding agent with the autonomous vehicle can include to predict the interaction based on the one or more homotopy parameters.

The one or more homotopy parameters can include potential constraints of an agent. The one or more homotopy parameters can be indicative of a particular physical characteristic of an agent. In one or more example systems, the one or more homotopy parameters are indicative of one or more of: a speed of the agent, an acceleration of the agent, and a location of the agent. The one or more homotopy parameters can include a number of homotopies. The one or more homotopy parameters can include a size of a homotopy. The homotopy parameters are not limited to the above, and other parameters can be used as well.

In one or more example systems, to predict the interaction based on the one or more homotopy parameters can include predicting the interaction by inputting the one or more homotopy parameters or sensor data into a neural network model, such as discussed with respect to FIG. 5B and FIG.

5C. The neural network model may be a machine learning model. The neural network model may be and/or include an artificial intelligence model. The neural network model may output a prediction. The neural network may output an interaction parameter. Multiple features or parameters can be combined into a scalar number which can be used to train the neural network. For example, an offline-planner may be used to annotate a dataset with the final importance factor. Real-time requirements can be dropped. Ground truth predictions can be utilized. In some embodiments, system 500 can use a neural network model to generate at least one prediction to provide the interaction parameter. In an example, system 500 can use a neural network model to generate at least one prediction based on system 500 providing homotopy parameter(s) to the neural network model. In such an example, the neural network model can generate at least one prediction based on the homotopy parameter(s). The at least one prediction can include a prediction of a probability of the agent interacting with the autonomous vehicle.

Based on the interaction parameters, the autonomous vehicle compute 540 can determine a primary agent set. The primary agent set can be the agent set. The primary agent set can be a subset of the agent set. The primary agent set can be a proper subset of the agent set. For example, the primary agent set can be not equal to the agent set. For example, the agent set can include at least one element, such as an agent, which is not in the primary agent set. The primary agent set can be a rearrangement of the agent set. The primary agent set can be a confirmation of the primary agent set. The primary agent set can include the same number of agents as the agent set. The primary agent set can include less agents than the agent set. The primary agent set can be the result of a filtering of the agent set. The primary agent set can be the result of a prioritization scheme applied to the agent set.

In one or more example systems, to determine, based on the interaction parameters, the primary agent set can include to determine the primary agent set by filtering out, such as removing, eliminating, excluding, from the agent set, one or more agents of the agent set based on the interaction parameters. For example, filtering can be applied to the agent set to determine the primary agent set. The filtering may reduce the number of agents between the agent set and the primary agent set. The filtering may not reduce the number of agents between the agent set and the primary agent set. The filtering may remove one or more agents from the agent set to determine the primary agent set.

The filtering may be based on the interaction parameter. For example, if there is a low probability of an agent interacting with the autonomous vehicle, as represented by the interaction parameter, the agent may be filtered out.

In one or more example systems, the filtering can be based on a criterion applied to the interaction parameters. For example, the criterion may be based on a threshold. The criterion may be a probability threshold of the agent interacting with the autonomous vehicle. In accordance with the interaction parameter of a corresponding agent meeting the criterion, the corresponding agent may be filtered out in the determination of the primary agent set. In accordance with the interaction parameter of a corresponding agent not meeting the criterion, the corresponding agent may not be filtered out in the determination of the primary agent set. Agents which are not filtered out can be included in the primary agent set.

Different filtering schemes can be used for the filtering out. For example, one or more of: agent line-of-sight distance and velocity (Euclidian distance reachability radius), road infrastructure reachability (agents in an opposite lane on a road with lane divider barriers), and geometric collisions between agent projected polygons and autonomous vehicle possible paths. Euclidean distance-based radii can cache computed distance radii for further filters. Road infrastructure reachability can use cached distance, can expand reachable road network graphs, and can cache road segments with agents. Geometric collisions may be checked for autonomous vehicle segments corresponding to road segments cached with an agent.

In one or more example systems, to determine, based on the interaction parameters, the primary agent set can include to determine the primary agent set by applying, to the agent set, a prioritization scheme based on the interaction parameters. The prioritization scheme can be applied instead of the filtering. The prioritization scheme can be applied in conjunction with the filtering. The prioritization scheme may be applied before the filtering. The prioritization scheme may be applied during the filtering. The prioritization scheme may be applied after the filtering. Agents that the prioritization scheme is applied to may be included in the primary agent set.

The prioritization scheme may be stored in the autonomous vehicle compute 540. The prioritization scheme may be determined by the autonomous vehicle compute 540. The prioritization scheme may be determined in real time.

The prioritization scheme may be used to rearrange agents in the agent set and/or the primary agent set. For example, the prioritization scheme can reorder agents in the agent set and/or the primary agent set. The prioritization scheme can reorder agents in the agent set and/or the primary agent set based on likelihood of interaction with the autonomous vehicle. The prioritization scheme can reorder agents in the agent set and/or the primary agent set based on a prediction of interaction with the autonomous vehicle. The prioritization scheme can reorder agents in the agent set and/or the primary agent set based on probability of interaction with the autonomous vehicle.

The prioritization scheme may provide a prioritization order to the primary agent set as compared to the agent scheme. For example, the prioritization scheme may order the agents in the agent set based on a prioritization of interaction of the agents with the autonomous vehicle. The prioritization scheme may be used to determine an order of "importance" of the agents in the agent set and/or the primary agent set.

In one or more example systems, the prioritization scheme can be based on a criterion applied to the interaction parameters. In accordance with the interaction parameter of a corresponding agent meeting the criterion, the corresponding agent may be moved to a higher priority in the determination of the primary agent set. In accordance with the interaction parameter of a corresponding agent not meeting the criterion, the corresponding agent may not be moved to a higher priority in the determination of the primary agent set.

The filtering and/or prioritization scheme can be used, generally, to predict importance of agents. The importance of the agent can be based on the interaction parameter of the agent. The interaction parameter of the agent can be based on, for example, one or more of: an effect of each agent on a number and/or size of homotopies, an effect of each agent on properties of the final trajectory of the autonomous vehicle (such as acceleration), independent effects of each agent, dependent effects of each agent based on other agents.

While the filtering and/or prioritization scheme is discussed with respect to the determining the primary agent set, the filtering and/or prioritization scheme can be used at many different points during the operation of the autonomous vehicle compute 540. New primary agent sets, such as a first primary agent set, a second primary agent set, a third primary agent set, etc. can be determined at different processing points.

For example, FIG. 5A shows an agent filtration identification point 501. This agent filtration identification point 501 can be representative of the filtering and/or prioritization scheme discussed herein, such as a determining of a primary agent set, and/or such as providing the primary agent set to any other elements of 500. As shown in FIG. 5A, the agent filtration identification point 501 can be performed at one or more of: during the agent recognition 504, after the agent recognition 504, after the agent prediction 506, after the agent projection 508, after the perception system 514, during the motion planning 510, and after the motion planning 510. The particular time for using the agent filtration identification point 501 is not limiting. The agent filtration identification point 501 can be configured to provide the primary agent set to one or more of: the agent recognition 504, the agent prediction 506, the agent projection 508, the perception system 514, the motion planning 510.

The agent filtration identification point 501 can be a point in which the filtering and/or prioritization scheme can be updated. Therefore, the filtering and/or prioritization scheme may be dynamic. Alternatively, the filtering and/or prioritization scheme may be static. The filtering and/or prioritization scheme can be applied iteratively. The filtering and/or prioritization scheme can be applied once. The filtering and/or prioritization scheme can be applied multiple times. The filtering and/or prioritization scheme can be applied continuously.

Advantageously, filtering and/or the prioritization scheme can be used at different points, such as at a plurality of points, during processing, which can improve computational efficiency. For example, filtering can greatly improve costly stages of the autonomous vehicle, such as maneuver exploration. Further, the cascading nature of the filtering and/or the prioritization scheme can be advantageous. An agent that is filtered out early may not be included later in the processing pipeline, thereby improving computational efficiency.

In one or more example systems, the system can cause the at least one processor to cluster agents of the plurality of agents. For example, the system can cause the at least one processor to cluster, based on the one or more homotopy parameters, agents of the plurality of agents. The homotopy parameter may indicate an agent trajectory projection onto a trajectory of the autonomous vehicle, such as a projected distance between two agents. For example, the homotopy parameter may include a projected distance between two agents. For example, the system can cluster agents of the plurality of agents based on an agent trajectory projection onto a trajectory of the autonomous vehicle. If the agent trajectory projection is close enough between two agents, the two agents can be clustered together. The clustering of agents of the plurality of agents can be based on a projected distance between agents. The system can cluster agents based on the interaction parameter of the corresponding agents. The system can cluster agents based on one or more homotopy parameters. For example, the homotopy parameter may include an interaction parameter of the corresponding agents.

For example, the automotive vehicle compute 540 can cluster together related agents. This can improve computational efficiency. For example, if the autonomous vehicle is located near a cross walk, a number of pedestrians may cross the cross walk. Instead of individually determining and/or tracking each of the pedestrians as an agent, which may require high computational power, the system can be configured to cluster the pedestrians together as a single agent. This can be based on, for example, homotopy parameters indicating that the group of pedestrians are moving at approximately the same speed and the same direction. For example, the overall impact of a set of agents may be determined to be similar.

For example, an impact of agents in a set of agents may be similar to each other, suggesting that the agents can be clustered together during training and execution. For example, the impact of multiple pedestrians crossing the road simultaneously would be similar and the filtration/prioritization scheme applied to one could be applied to all. The clustering can be performed during the determination of agents for the agent set. The clustering can be performed during the determination of the primary agent set. As an example, clustering can be a form of filtering agents of the agent set, such as discussed herein.

For example, for each agent, such as based on a homotopy extractor, a clustering parameter for each of the plurality of agents can be determined. The clustering parameters for each agent can be compared, such as a first clustering parameter for a first agent and a second clustering parameter for a second agent. In accordance with the first clustering parameter and the second clustering parameter both meeting a clustering criterion, the second agent can be filtered out. In accordance with either the first clustering parameter or the second clustering parameter not meeting a clustering criterion, the second agent may not be filtered out.

The clustering can be performed on lower priority agents. The clustering can be performed on higher priority agents. The clustering can be performed on all agents.

In one or more example systems, the at least one memory storing instructions thereon that, when executed by the at least one processor, cause the at least one processor to determine, by the at least one processor, a secondary agent set. The second agent set can be determined based on the interaction parameters. The primary agent set and the secondary agent set may be mutually exclusive subsets of the agent set. For example, the primary agent set may not include any agents of the secondary agent set, and vice versa. The primary agent set and the secondary agent set may not be mutually exclusive subsets of the agent set. The secondary agent set may include agents that are considered of less probability of interaction based on their corresponding interaction parameter. For example, an agent may be included in the secondary agent set when the corresponding agent does not meet a criterion. An agent may be included in the primary agent set when the corresponding agent meets a criterion.

The primary agent set can be obtained by the planning system 516. The secondary agent set can be obtained by the planning system 516. The planning system 516 can perform motion planning 510, such as a trajectory extraction scheme. The motion planning 510 can be used for determining potential movement, such as motion, of the autonomous vehicle. Based on the motion planning 510, specifically the results and/or trajectories output by the motion planning 510, the autonomous vehicle computer 540 can perform trajectory evaluation 512, such as a trajectory evaluation scheme. For example, the motion planning 510 may generate one or more potential trajectories of the autonomous vehicle. The trajectory evaluation 512 can then evaluate each of the potential trajectories to generate a trajectory for the autonomous vehicle that could be performed by the autonomous vehicle. For example, the trajectory evaluation 512 can obtain the primary agent set for evaluation the potential trajectories. The trajectory evaluation 512 can generate, based on the primary agent set, the trajectory for the autonomous vehicle for operating the autonomous vehicle. A trajectory of an agent may be characterized by one or more trajectory parameters indicative of a position of the agent in space and time. A trajectory may be seen as a trajectory output including one or more trajectory parameters.

In one or more example systems, to generate, based on the primary agent set, the trajectory for the autonomous vehicle can include to generate, based on the primary agent set and the secondary agent set, the trajectory for the autonomous vehicle. The trajectory of the autonomous vehicle can be generated based on only the secondary agent set.

In one or more example systems, to generate, based on the primary agent set, the trajectory for the autonomous vehicle can include applying a first model to an agent of the primary agent set. For example, the first model can be applied to each agent of the primary agent set.

In one or more example systems, to generate, based on the primary agent set and the secondary agent set, a trajectory for the autonomous vehicle can include to apply a second model to one or more agents of the secondary agent set. For example, the second model can be applied to each agent of the secondary agent set.

The first model may be different from the second model. The first model may have different parameters than the second model. In one or more example systems, the first model can have a higher fidelity than the second model. In one or more example systems, the first model or second model comprises one or more of: an agent recognition scheme, an agent prediction scheme, an agent projection scheme, a trajectory extraction scheme, and a trajectory evaluation scheme. The first model may be, for example, Game-theoretic interaction aware planning and/or a Krauss Lane-Follow algorithm. The second model may be, for example, one or more of: a constant velocity algorithm. These models can be particularly useful for the agent prediction 506.

The first model and/or the second model can be used for the agent prediction 506 as well. For example, the prioritization scheme may be useful for determining the fidelity of geometric representation of the agents. The first model may project using complex, possibly non-convex polygons. The second model may project using bounding boxes.

The first model and/or the second model can also be used for motion planning 510. For example, the first model can use constraint extraction while the second model may not use constraint extraction. By skipping constraint extraction for low priority agents, the total computation can be reduced.

The first model and/or the second model can also be used for trajectory evaluation 512. For example, the first model can use high sampling rates for collision checking while the second model can use low sampling rates.

The agent recognition 504 may be configured to identify the agent based on the sensor data 502. For example, applying the first model can include applying a first agent recognition scheme to the primary agent set. For example, applying the second model can include applying a second agent recognition scheme to the secondary agent set. For example the second agent recognition scheme can have lower fidelity than the first agent recognition scheme.

Applying the first model to the agent of the primary agent set can include predicting a trajectory of the agent of the primary agent set. For example, applying the second model to the agent of the secondary agent set can include predicting a trajectory of the agent of the secondary agent set.

For example, applying the first model to the agent of the primary agent set and/or the second model to the agent of the secondary agent set can include projecting a trajectory of the agent onto areas, such as environments, associated with the autonomous vehicle. Areas associated with the autonomous vehicle may include road surfaces that could be (or will be) traversed by the autonomous vehicle. When applying the agent projection 508, the first model for prioritization may be used to determine the fidelity of the geometric representation of the agent. For example, high priority objects of the primary agent set can be projected using complex, possibly non-convex polygons, whereas low-priority agents of the secondary agent set can be projected with simpler bounding boxes.

In certain systems, the second model may be applied to both the primary agent set and the secondary agent set. The first model can then additionally be applied to the primary agent set.

A third model may be applied to a tertiary agent set. A fourth model may be applied to a quaternary agent set. The number of models and agent sets is not limiting.

In one or more example systems, the system, such as the control system 408 and/or the AV compute 540, can cause the at least one processor to operate, based on the trajectory, the autonomous vehicle. The autonomous vehicle can operate, such as drive, the autonomous vehicle. A processor can be configured to operate, such as drive, the autonomous vehicle. The system can be configured to drive the autonomous vehicle. The system can be configured to operate the autonomous vehicle. For example, a plurality of trajectories may be generated and seen as a candidate trajectories. The autonomous vehicle compute 540 may be configured to select a trajectory amongst the candidate trajectories and optionally navigate according to the selected trajectory.

FIG. 5B illustrates a diagram of one or more implementations of a process for agent prioritization and/or filtering, e.g. for determining an autonomous vehicle trajectory. Specifically FIG. 5B illustrates further details of the perception system 514 and the planning system 516.

As shown, the perception system 514 may receive the sensor data 502. The perception system 514 may further include a neural network model 520, such as a neural network. The neural network model 520 may encompass one or more of the agent recognition 504, agent prediction 506, and agent projection 508 discussed above with respect to FIG. 5A.

The neural network model 520 can include a number of heads, such as nodes, models, parameters, schemes. For example, the neural network model 520 can include one or more of a perception head 522, such as a detection head, a prioritization head 524, such as an importance classification head, and a prediction head 526. The perception head 522 may, in certain examples, encompass the agent recognition 504 discussed above. The prediction head 526 may, in certain examples, encompass the agent prediction 506 and agent projection 508 discussed above. The prioritization head 524, may be used for the determination of the primary agent set, such as using the filtering and/or prioritization scheme discussed above.

As shown in FIG. 5B, the neural network model 520 can receive the sensor data 502. The perception head 522 may use the sensor data to determine the agent set. The agent set can include one or more agents located in the environment. The agent set can include a plurality of agents located in the environment.

The perception head 522 may output the agent set to one or more additional heads in the neural network 520.

For example, the perception head may output the agent set to a prediction head 526. The prediction head 526 can utilize the agent set, along with sensor data 502, to predict movement of any agents in the agent set. The prediction head 526 can utilize, for example, machine learning and/or artificial intelligence to predict the movement of any agents in the agent set. Moreover, the prediction head 526 may determine, for each agent of the agent set, an interaction parameter. The interaction parameter can be indicative of a prediction of interaction of a corresponding agent with the autonomous vehicle. For example, the prediction head 526 can predict whether or not it is likely that a particular agent will interact with the autonomous vehicle. The prediction head 526 can output data indicative of a prediction, as well as the interaction parameter. For example, the interaction parameter may be stored along with a particular agent in the agent set.

The perception head 522 may output the agent set to a prioritization head 524. The prioritization head 524 may be a rules-based prioritization head. The prioritization head 524 may be a machine learning, such as a neural network, based prioritization head. The prioritization head 524 can provide a prioritization scheme of different agents, such as in the agent set. The prioritization head 524 may apply filtering. The prioritization head 524 can determine, such as by at least one processor, a primary agent set from the agent set. The prioritization head 524 may determine the primary agent set based on the interaction parameters from the prediction head 526. Further, the prioritization head 524 can provide an output to the prediction head 526 for prioritization of agent analysis.

For example, the prioritization head 524 can receive an output from the prediction head 526, such as the interaction parameter, in order to perform a prioritization. The prioritization head 524 may output prioritization, such as based on criterion. The prioritization head 524 may output prioritization to the prediction head 528.

The perception system 514 may then optionally apply a feature based prioritization 528 to the primary agent set and/or the agent set. The features may be homotopies. The features may be interaction parameters. The feature based prioritization may include the filtering and/or prioritization scheme discussed herein. For example, the prioritization head 524 may provide the feature bases prioritization 528. The feature-based prioritization 528 may rearrange the order of agents in the primary agent set, such as based on a prioritization scheme. For example, the feature-based prioritization may rearrange the agents of the primary agent set based on a feature. The feature can be the one or more homotopy parameters. The feature-based prioritization 28 may also provide filtering of the agent set and/or the primary agent set.

The primary agent set may be output from the perception system 514. For example, the primary agent set may be output to the planning system 516.

The planning system 516 may receive an output from the perception system 514. For example, the planning system 516 may receive the primary agent set as an input.

The planning system 516 may apply more homotopy searches 530, such as homotopy extractions to the agents in the primary agent set. The planning system 516 may apply more homotopy searches 530, such as homotopy extractions to the agents in the agent set. The homotopy search 530 may be, for example, the motion planning 510 discussed above in FIG. 5A.

As shown in FIG. 5B, the homotopy search 530 may produce a potential trajectory 532. The homotopy search 530 may produce a number of potential trajectories 532, 532A, 532B, and/or homotopies, also known as trajectory realization. There is no particular limit to the number of trajectories, and any number of trajectory generators can be produced.

Based on the potential trajectories 530, 530A, 530B, the planning system 516 can make a trajectory selection 534. This may include the trajectory evaluation 512 discussed above with respect to FIG. 5A. Further, the planning system 516 may generate a trajectory of the autonomous vehicle. For example, the planning system 516 may generate, based on the primary agent set and/or the agent set, a trajectory for the autonomous vehicle.

A trajectory of an agent may be characterized by one or more trajectory parameters indicative of a position of the agent in space and time. A trajectory may be seen as a trajectory output including one or more trajectory parameters.

FIG. 5C illustrates further details of the perception system 514, such as including the neural network 520. In particular, FIG. 5C illustrates how one or more models, such as the first model and/or the second model, can be applied to agent sets.

As discussed, the perception system 514 can obtain sensor data 502. The neural network 520 can further receive the sensor data 502. From the sensor data 502, a number of neural network heads can be used such as the perception head 522 and the prioritization head 524 discussed above.

The perception head 522 and the prioritization head 524 can work together to determine the primary agent set and the secondary agent set. For example, high priority agents can be included in the primary agent set while lower priority agents can be included in the secondary agent set. The prioritization head 524 may be pretrained. The prioritization head 524 may be trained.

A first model 542, such as a fine-grained prediction head, may be applied to the primary agent set. The first model 542 may have a high fidelity, as the primary agent set can include agents that are predicted to interact with the autonomous vehicle. The first model 542 may be expensive to compute. Accordingly, computational power may be used to prepare more robust analysis of the primary agent set. The first model 542 may be pretrained. The first model 542 may be trained.

A second model 544, such as a coarse-grained prediction head, may be applied to the secondary agent set. The second model 544 may have a low fidelity, as the secondary agent set can include agents that are predicted to not interact with the autonomous vehicle. The second model 544 may be cheaper to compute. The second model 544 may have a lower fidelity than the first model 542. Accordingly, computational power may be reduced, at least as compared to the first model 542, to prepare a less robust analysis of the secondary agent set. The second model 544 may be pretrained. The second model 544 may be trained.

Further, the agent filtration identification point 501 can be used within the neural network 520. As shown in FIG. 5C, the agent filtration identification point 501 can be used with the prioritization head 524. The agent filtration identification point 501 can be used with the first model 542. Further, the agent filtration identification point 501 could be used with the perception head 522 and/or the second model 544.

Figure 6:
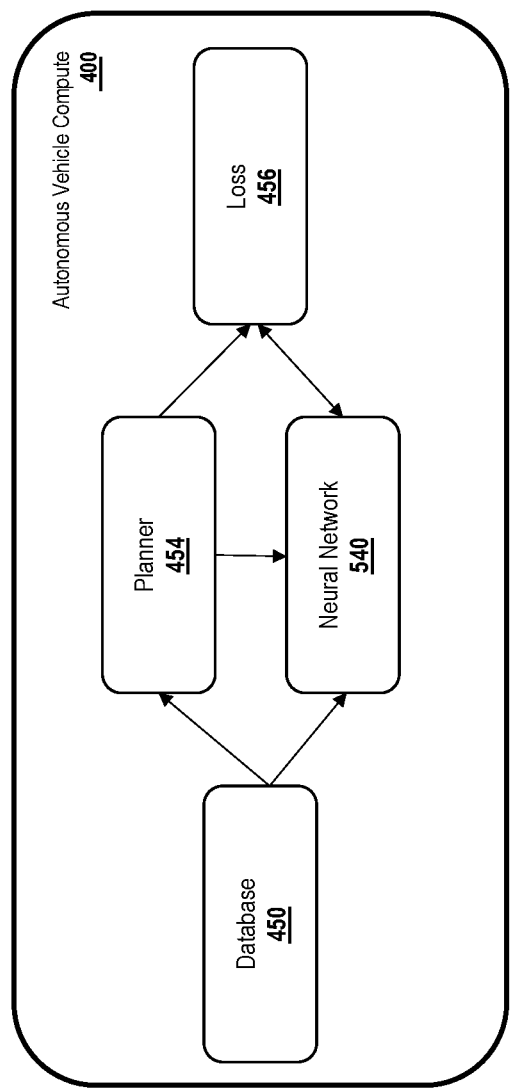
FIG. 6 is a diagram of training procedures for an example implementation of a process for agent prioritization.

FIG. 6 illustrates a system for training the autonomous vehicle compute 400, such as for a neural network 540. The autonomous vehicle compute 400 may operate according to operations of the autonomous vehicle computer 540 of FIGS. 5A-5C. This can be done for creating more accurate and/or more efficient trajectory maps. Database 450 stores data that is transmitted to, received from, and/or updated by perception system 402, planning system 404, localization system 406 and/or control system 408. In some examples, database 450 includes a storage component (e.g., a storage component that is the same as or similar to storage component 308 of FIG. 3) that stores data and/or software related to the operation and uses at least one system of autonomous vehicle computer 400. In some embodiments, database 450 stores data associated with 2D and/or 3D maps of at least one area. In some examples, database 450 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 450 can be implemented across a plurality of devices. In some examples, database 450 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, and/or a V2I system (e.g., a V2I system that is the same as or similar to V2I system 118 of FIG. 1) and/or the like. The database 450 can be physical databases, such as included in a vehicle. The database 450 can be a virtual database, such as a cloud database, that can be accessible by the vehicle.

The database 450, such as for example a database generated from an expert driver, can be used to provide data input to a neural network 540, such as an augmented prediction neural network. The database 450 can also provide data to a planner system 454, such as for ground truth. One or both of the neural network 540 and the planner system 454 can determine a loss indicative of a comparison on how the neural network 540 is performing as compared to how the neural network 540 should be performing. For example, an importance factor can be compared between the neural network 540 and the planner 454. The loss 456 can be output to one or more of the planner 454, neural network 540, and database 450 in order to improve the neural network 540. The loss 456 can be computed between the planner 454 and the neural network 540. For example, the loss 456 may be used to update, such as train, one or more of: the perception system 402, the planning system 404, the first model 542, the second model 544, the perception head 522, the prioritization head 524, the prediction head 526, the feature based prioritization 528, the homotopy search 530, the agent recognition 504, the agent prediction 506, the agent projection 508, and the motion planning 510. Features of the agents can be designated a scalar number, which can be used for training.

The planner system 454 may be used to extract homotopy and/or importance criterion. The planner system 454 can be used to train the neural network 540. For example, the planner system 454 can be used to extract how agents affect corridors of travel for the autonomous vehicle. The neural network 540 can be trained to extract the same information as if the planner system 454 was applied to each agent. While the planner system 454 may include man made, or preset, rules, the neural network 540 can avoid this and instead use machine learning.

For example, the planner system 454 can be run a large number of times to determine importance of agents on a given scenario. However, this can be time consuming and expensive to do for every potential interaction of the autonomous vehicle. However, the planner system 454 can be used to train the neural network 540 using the large number of scenarios run. The planner system 454 can be run offline, and thus may not be active during the operation of the autonomous vehicle.

Figure 7A:
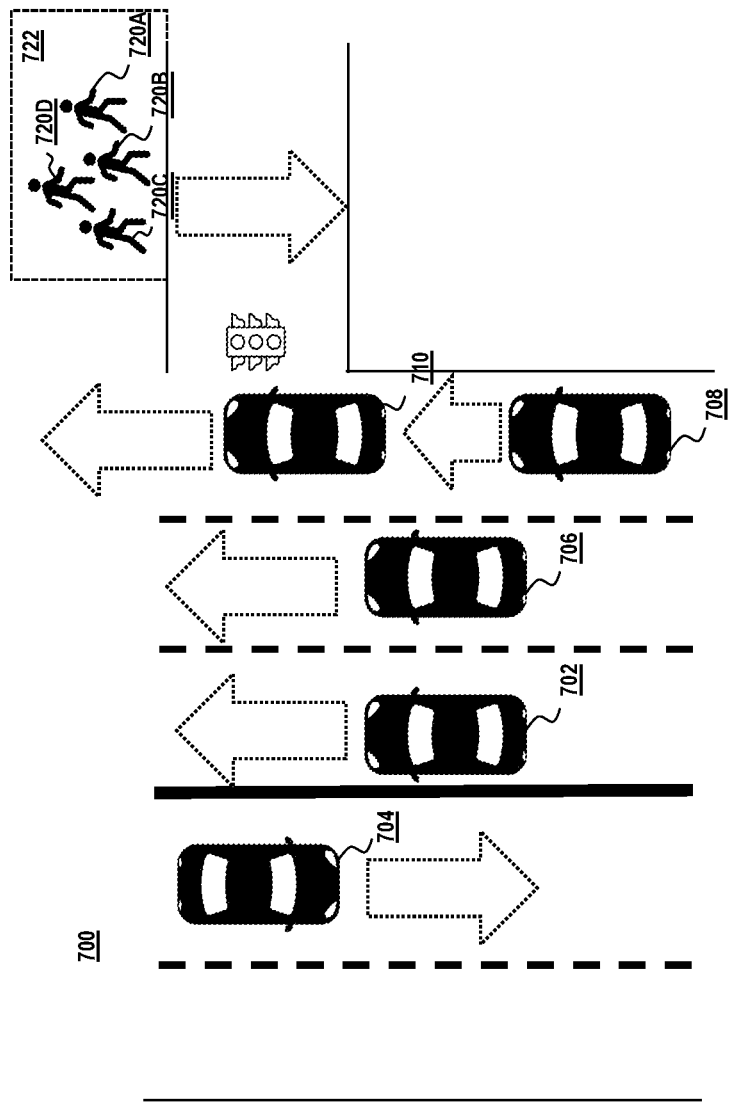
FIGS. 7A-7B are diagrams of an example implementation of a process for agent prioritization.
Figure 7B:
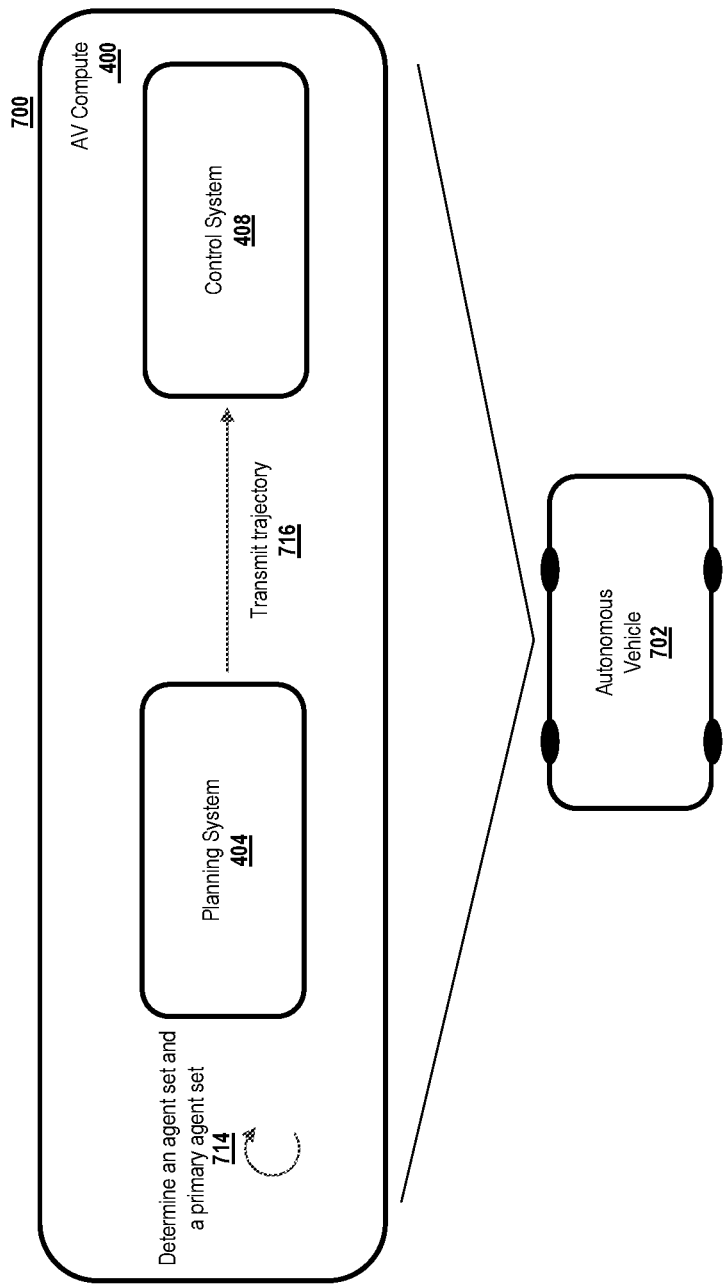

Referring now to FIGS. 7A-7B, illustrated are diagrams of an implementation 700 of a process for agent prioritization and/or agent filtering, e.g. for determining an autonomous vehicle trajectory. In some embodiments, implementation 700 includes the perception system 402 or perception system 514 and the planning system 404 or planning system 516 as disclosed in detail above. Further systems, such as the localization system 406, control system 408, etc., can be utilized as well.

Specifically, FIG. 7A illustrates a real-world example implementation 700 of a process for agent prioritization, and/or agent filtering, e.g. for determining an autonomous vehicle trajectory.

The autonomous vehicle 702 can include any and/or all of the systems, methods, and medium discussed in detail above. Autonomous vehicle 702 may have a direction as indicated in FIG. 7B. The autonomous vehicle 702 may obtain sensor data of the environment in which the autonomous vehicle 702 is operating in. The autonomous vehicle 702 can then determine, based on the sensor data, an agent set including a plurality of agents located in the environment.

In FIG. 7A, there are a number of agents that can be determined and included in the agent set. For example, there is a first agent 704, a second agent 706, a third agent 708, a fourth agent 710. The agents 704, 706, 708, 710 may be called vehicle agents. The agents can all have a current direction as indicated in FIG. 7A.

The autonomous vehicle 702 is configured to determine for each of the agents 704, 706, 708, and 710, an interaction parameter indicative of a prediction of interaction of the corresponding agent with the autonomous vehicle. As first agent 702 is separated from autonomous vehicle 702 by a guard rail, the first agent 702 will have a very low interaction parameter. Similarly, as fourth agent 710 is separated by a lane of traffic including second agent 706, and is also ahead of the autonomous vehicle 702, the fourth agent 710 will also have a low interaction parameter. As there may be some potential prediction of an interaction from the fourth agent 710, it can have a higher interaction parameter than the first agent 704.

Moving next to the second agent 706, it is both close to and in line with the autonomous vehicle 702. Accordingly, as there is a high prediction of interaction, the second agent 706 may have a high interaction parameter.

The third agent 708 is separated by a lane of traffic, but is located behind the autonomous vehicle. It may be predicted to have a relatively low interaction, and thus a low interaction parameter. Depending on the situational awareness, it may have a higher, lower, or equivalent interaction parameter than the fourth agent 710. For convenience, it will be assumed that the third agent 708 has an interaction parameter between that of the second agent 706 and the fourth agent 710.

Accordingly, the autonomous vehicle 702 can determine, based on the interaction parameters of the agents 704, 706, 708, and 710, a primary agent set. As discussed, the autonomous vehicle 702 may filter out and/or prioritize the plurality of agents to determine the primary agent set.

In the situation shown in FIG. 7A, the first agent 704 may have an interaction parameter that meets a criterion. Accordingly, the first agent 704 may be filtered out, and the autonomous vehicle 702 may not be concerned with the first agent 704.

A prioritization scheme may be applied to the remaining agents 706, 708, and 710, for example based on the criterion. Accordingly, the agents may be prioritized, from high priority to low priority, second agent 706, third agent 708, and fourth agent 710 in the determination of the primary agent set. The autonomous vehicle 702 may then generate, based on the primary agent set, the trajectory of the autonomous vehicle 702. Further, the autonomous vehicle 702 may operate along the trajectory.

Alternatively, the second agent 706 may be determined to be included in the primary agent set, while the third agent 708 and the fourth agent 710. A first model may be applied to the primary agent set having the second agent 706, which may have a high fidelity. This can be advantageous as there is a high prediction that the second agent 706 may interact with the autonomous vehicle 702. On the other hand, a second model may be applied the secondary agent set having the third agent 708 and the fourth agent 710, which may have a low fidelity. While the autonomous vehicle 702 is still concerned with the third agent 708 and the fourth agent 710, unlike the first agent 704, the prediction of interaction is low and thus a lower fidelity model can be used. This can advantageously save computational power of the autonomous vehicle 702.

Further agents that can be determined and included in the agent set are the agents 720A, 720B, 720C, 720D. For example, agents 720A, 720B, 720C, 720D can be called pedestrian agents. It can be computationally inefficient to track all of the agents 720A, 720B, 720C, 720D in order to include them in the agent set. Accordingly, the autonomous vehicle 702 can be configured to cluster the agents 720A, 720B, 720C, 720D together, if the autonomous vehicle 702 determines that they are likely moving in approximately the same speed and direction, for example. Accordingly, the autonomous vehicle 702 can treat the agents 720A, 720B, 720C, 720D as a single combined agent 722. Therefore, the autonomous vehicle 702 can determine the interaction parameter for the combined agent 722, instead of determining an interaction parameter for each of the agents 720A, 720B, 720C, 720D. This can save computational power.

FIG. 7B illustrates an example implementation 700 of a process for agent prioritization, and/or agent filtering, e.g. for determining an autonomous vehicle trajectory. As shown, an autonomous vehicle 702 may use sensors to determine sensor data. Based on the sensor data, the autonomous vehicle 702 may determine an agent set and a primary agent set 714 as discussed in detail above. The primary agent set can be obtained by the planning system 404, as detailed above. The planning system 404 can transmit, or output, a trajectory 716. For example, the planning system 404 can transmit a trajectory 716 to a control system 408. The control system 408 can be used to operate the autonomous vehicle 702, e.g., via a command indicative of the trajectory 716.

Figure 8:
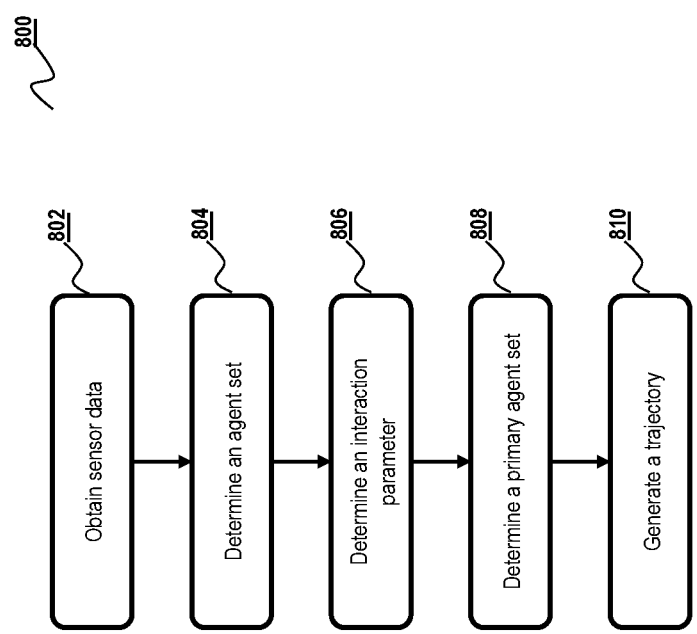
FIG. 8 illustrates a flowchart of an example process for agent prioritization.

Referring now to FIG. 8, illustrated is a flowchart of a process 800 for agent prioritization, and/or agent filtering, e.g. for determining an autonomous vehicle trajectory. The method can be performed by a system disclosed herein, such as an AV compute 40, and a vehicle 102, 200, 300, 702 of FIGS. 1, 2, 3, 4, 5A-5C, 6, and 7A-B. The system disclosed can include at least one processor which can be configured to carry out one or more of the operations of method 800.

The method 800 can be a method for operating an autonomous vehicle. In one or more example methods, the method 800 can include obtaining, at step 802, by at least one processor, sensor data associated with an environment in which an autonomous vehicle is operating. In one or more example methods, the method 800 can include determining 804, by the at least one processor, based on the sensor data, an agent set including a plurality of agents located in the environment. In one or more example methods, the method 800 can include determining 806, by the at least one processor, for each agent of the agent set, an interaction parameter indicative of a prediction of interaction of a corresponding agent with the autonomous vehicle. In one or more example methods, the method 800 can include determining 808, by the at least one processor, based on the interaction parameters, a primary agent set, wherein the primary agent set is a subset of the agent set. In one or more example methods, the method 800 can include generating 810, by the at least one processor, based on the primary agent set, a trajectory for the autonomous vehicle.

The autonomous vehicle can include at least one sensor. The sensor data can be from the at least one sensor. The sensor data can be from one or more sensors associated with the autonomous vehicle.

The interaction parameter can be indicative of an interaction of the corresponding agent for the trajectory of the autonomous vehicle, e.g., due to potential interaction, a potential conflict, and/or potential collision. For example, the interaction parameter may be indicative of a potential future interaction of the corresponding agent with the autonomous vehicle, such as a predicted interaction, such as a probability of the agent interacting with the autonomous vehicle. For example, the interaction parameter may be indicative of a prediction of a level of interaction of the corresponding agent interacting with the autonomous vehicle.

The primary agent set may be a proper subset of the agent set.

A trajectory may be characterized by one or more trajectory parameters indicative of a position of the agent in space and time. A trajectory may be seen as a trajectory output including one or more trajectory parameters.

In one or more example methods, determining, based on the interaction parameters, the primary agent set can include determining the primary agent set by filtering out one or more agents of the agent set based on the interaction parameters.

The agents of the agents set that are not filtered out may be included in the primary agent set.

In one or more example methods, determining, based on the interaction parameters, the primary agent set can include determining the primary agent set by applying, to the agent set, a prioritization scheme based on the interaction parameters.

The agents of the agent set that are prioritized can be included in the primary agent set.

In one or more example methods, the filtering or the prioritization scheme is based on a criterion applied to the interaction parameters.

In one or more example methods, the filtering and/or the prioritization scheme is based on a criterion applied to the interaction parameters.

In other words, the method can include determining whether an interaction parameter of a corresponding agent meets a criterion, such as a threshold. For example, an agent may be included in the primary agent set when the interaction parameter of the agent meets the criterion.

In one or more example methods, generating, based on the primary agent set, the trajectory for the autonomous vehicle includes applying a first model to an agent of the primary agent set.

In one or more example methods, the method 800 can further include determining, by the at least one processor, based on the interaction parameters, a secondary agent set, wherein the primary agent set and the secondary agent set are mutually exclusive subsets of the agent set.

For example the secondary agent set can include agents that are considered of less interaction, such as based on their interaction parameter. For example, an agent can be included in the secondary agent set when the interaction parameter of the agent does not meet the criterion.

In one or more example methods, generating, based on the primary agent set, the trajectory for the autonomous vehicle can include generating, based on the primary agent set and the secondary agent set, the trajectory for the autonomous vehicle.

In one or more example methods, generating, based on the primary agent set and the secondary agent set, a trajectory for the autonomous vehicle can include applying a second model to one or more agents of the secondary agent set.

A third model may be applied, a fourth model may be applied, a fifth model may be applied, etc. The second model may be different than the first model.

In one or more example methods, the first model can have a higher fidelity than the second model.

In one or more example methods, the first model or second model can include one or more of: an agent recognition scheme, an agent prediction scheme, an agent projection scheme, a trajectory extraction scheme, and a trajectory evaluation scheme.

The method, such as the agent recognition scheme, may be configured to identify an agent based on the sensor data. For example, applying the first model can include applying a first agent recognition scheme to the primary agent set. For example, applying the second model can include applying a second agent recognition scheme to the secondary agent set. For example the second agent recognition scheme can have a lower fidelity than the first agent recognition scheme. For example, applying the first model to an agent of the primary agent set can include predicting a trajectory of the agent of the primary agent set. For example, applying the second model to an agent of the secondary agent set can include predicting a trajectory of the agent of the secondary agent set.

For example, applying the first model to an agent of the primary agent set and/or the second model to an agent of the secondary agent set can include projecting a trajectory of the agent onto areas associated with the autonomous vehicle, such as an environment. Areas associated with the autonomous vehicle may include road surfaces that could be (or will be) traversed by the autonomous vehicle. When projecting a detected agent onto the autonomous vehicle's path, the first model for prioritization may be used to determine the fidelity of the geometric representation of the agent, e.g., high priority objects of the primary agent set can be projected using complex, possibly non-convex polygons, whereas low-priority agents of the secondary agent set can be projected with simpler bounding boxes.

For trajectory extraction, constraints can be applied on the autonomous vehicle's intended trajectory from each agent detected. By prioritizing agents and objects that are more constraining, constraint extraction can be skipped for less-constraining agents and thus reduce the total computation.

Regarding trajectory evaluation, when evaluating a trajectory, the AV compute can check for collisions with detected objects. Low-priority objects could run collision checking with a lower sampling rate than higher priority objects.

In one or more example methods, determining, by the at least one processor, for each agent of the agent set, an interaction parameter indicative of a prediction of interaction of the corresponding agent with the autonomous vehicle can include predicting an interaction of the corresponding agent with the autonomous vehicle, and determining the interaction parameter based on the prediction. In one or more example methods, determining, by the at least one processor, for each agent of the agent set, an interaction parameter indicative of a prediction of interaction of the corresponding agent with the autonomous vehicle can include predicting an interaction of the corresponding agent with the autonomous vehicle. In one or more example methods, determining, by the at least one processor, for each agent of the agent set, an interaction parameter indicative of a prediction of interaction of the corresponding agent with the autonomous vehicle can include determining the interaction parameter based on the prediction.

In one or more example methods, predicting the interaction of the corresponding agent with the autonomous vehicle can include determining, for each agent, one or more homotopy parameters indicative of a constraint applied by the agent on a trajectory of the autonomous vehicle, and predicting the interaction based on the one or more homotopy parameters. In one or more example methods, predicting the interaction of the corresponding agent with the autonomous vehicle can include determining, for each agent, one or more homotopy parameters indicative of a constraint applied by the agent on a trajectory of the autonomous vehicle. In one or more example methods, predicting the interaction of the corresponding agent with the autonomous vehicle can include predicting the interaction based on the one or more homotopy parameters.

The homotopy parameter may include a number of homotopies. The homotopy parameter may include a size of an homotopy.

In one or more example methods, predicting the interaction based on the one or more homotopy parameters can include predicting the interaction by inputting the one or more homotopy parameters or sensor data into a neural network model.

In one or more example methods, predicting the interaction based on the one or more homotopy parameters can include predicting the interaction by inputting the one or more homotopy parameters and/or sensor data into a neural network model.

Multiple features or parameters can be combined into a scalar number, which can be used to train a neural network model. An offline-planner may be used to annotate a dataset with the final importance, such as at a factory. Real-time requirement(s) can be dropped. Ground truth predictions can be utilized. Further, curation of the data can be used for training of the neural network model.

In one or more example methods, the one or more homotopy parameters can be indicative of one or more of: a speed of the agent, an acceleration of the agent, and a location of the agent.

In one or more example methods, the method 800 can include clustering, based on the one or more homotopy parameters, agents of the plurality of agents.

The impact of agents may be similar to each other, suggesting that the agents can be clustered together during training and execution. For example, the impact of multiple pedestrians crossing the road simultaneously could be similar, and the filtration/prioritization scheme applied to one of the pedestrians could be applied to all. For example, the method can include determining, based on the homotopy extractor, a clustering parameter for each of the plurality of agents. The method can include comparing the clustering parameter of a first agent of the plurality of agents with a clustering parameter of a second agent of the plurality of agents. In accordance with the first clustering parameter and the second clustering parameter both meeting a clustering criterion, the method can include filtering out the second agent.

In one or more example methods, an agent of the plurality of agents can include an object capable of a dynamic movement over time.

An agent can be any object that is captured by sensors, such as a road user, and/or road equipment.

In one or more example methods, the method 800 can include: operating, based on the trajectory, the autonomous vehicle.

For example, a plurality of trajectories may be generated and seen as a candidate trajectories. The autonomous vehicle compute may be configured to select a trajectory amongst the candidate trajectories and optionally navigate according to the selected trajectory.

Further disclosed herein is a method for operating an autonomous vehicle. In one or more example methods, the method can include obtaining, by at least one processor, sensor data associated with an environment in which an autonomous vehicle is operating. In one or more example methods, the method can include determining, by the at least one processor, based on the sensor data, an agent set comprising a plurality of agents located in the environment. In one or more example methods, the method can include determining, by the at least one processor, a primary agent set by applying, to the agent set, a prioritization scheme based on the sensor data. In one or more example methods, the method can include generating, by the at least one processor, based on the primary agent set, a trajectory for the autonomous vehicle.

Figure 9:
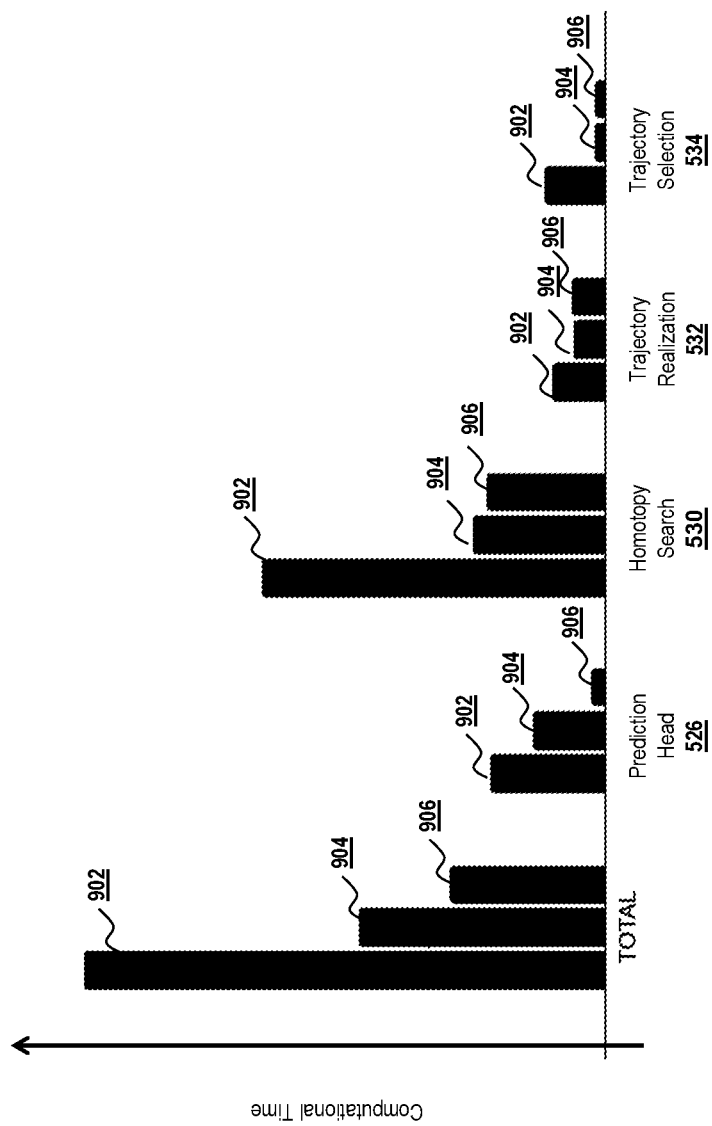
FIG. 9 is a diagram of computational efficiency data including a process for agent prioritization.

FIG. 9 illustrates one of the advantages of the disclosed embodiments, systems, methods, and computer program products. The y-axis illustrates the latency of trajectory extraction timeline using different aspects of the disclosure along the x-axis, which can for example illustrate the computational time. The y-axis may be understood to represent computational time, generally. Different types of models are shown including a high fidelity model 902, a medium fidelity model 904, and a low fidelity model 906 for prediction head 526, for homotopy search 530, trajectory realization 532, trajectory selection 534 (e.g. illustrated in connection with FIG. 5B). The first model may be the high fidelity model 902, and the second model may be either the medium fidelity model 904 or the low fidelity model 906.

Alternatively, the first model may be the medium fidelity model 904 and the second model may be the low fidelity model 906.

As shown, there may be strong computational efficiency advantages to using the disclosed embodiments, systems, methods, and computer program products for agent prioritization, and/or agent filtering, e.g. for determining an autonomous vehicle trajectory.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are methods, non-transitory computer readable media, and systems according to any of the following items:

Item 1. A method for operating an autonomous vehicle, the method comprising:
 obtaining, by at least one processor, sensor data associated with an environment in which an autonomous vehicle is operating,
 determining, by the at least one processor, based on the sensor data, an agent set comprising a plurality of agents located in the environment;
 determining, by the at least one processor, for each agent of the agent set, an interaction parameter indicative of a prediction of interaction of a corresponding agent with the autonomous vehicle;
 determining, by the at least one processor, based on the interaction parameters, a primary agent set, wherein the primary agent set is a subset of the agent set; and
 generating, by the at least one processor, based on the primary agent set, a trajectory for the autonomous vehicle.

Item 2. The method of Item 1, wherein determining, based on the interaction parameters, the primary agent set comprises determining the primary agent set by filtering out one or more agents of the agent set based on the interaction parameters.

Item 3. The method of the previous Items, wherein determining, based on the interaction parameters, the primary agent set comprises:
 determining the primary agent set by applying, to the agent set, a prioritization scheme based on the interaction parameters.

Item 4. The method of any of Items 2-3 wherein the filtering or the prioritization scheme is based on a criterion applied to the interaction parameters.

Item 5. The method of the previous Items, wherein generating, based on the primary agent set, the trajectory for the autonomous vehicle comprises applying a first model to an agent of the primary agent set.

Item 6. The method of any one of the previous Items, further comprising determining, by the at least one processor, based on the interaction parameters, a secondary agent set, wherein the primary agent set and the secondary agent set are mutually exclusive subsets of the agent set.

Item 7. The method of Item 6, wherein generating, based on the primary agent set, the trajectory for the autonomous vehicle comprises:
generating, based on the primary agent set and the secondary agent set, the trajectory for the autonomous vehicle.

Item 8. The method of any of Items 5-7, wherein generating, based on the primary agent set and the secondary agent set, a trajectory for the autonomous vehicle comprises:
applying a second model to one or more agents of the secondary agent set.

Item 9. The method of Item 8, wherein the first model has a higher fidelity than the second model.

Item 10. The method of any one of Items 8-9, wherein the first model or second model comprises one or more of: an agent recognition scheme, an agent prediction scheme, an agent projection scheme, a trajectory extraction scheme and a trajectory evaluation scheme.

Item 11. The method of any one of the previous Items, wherein determining, by the at least one processor, for each agent of the agent set, an interaction parameter indicative of a prediction of interaction of the corresponding agent with the autonomous vehicle comprises:
predicting an interaction of the corresponding agent with the autonomous vehicle; and
determining the interaction parameter based on the prediction.

Item 12. The method of Item 11, wherein predicting the interaction of the corresponding agent with the autonomous vehicle comprises:
determining, for each agent, one or more homotopy parameters indicative of a constraint applied by the agent on a trajectory of the autonomous vehicle; and
predicting the interaction based on the one or more homotopy parameters.

Item 13. The method of Item 12, wherein predicting the interaction based on the one or more homotopy parameters comprises predicting the interaction by inputting the one or more homotopy parameters or sensor data into a neural network model.

Item 14. The method of Items 12-13, wherein the one or more homotopy parameters are indicative of one or more of: a speed of the agent, an acceleration of the agent, and a location of the agent.

Item 15. The method of any one of Items 12-13, wherein the method comprises clustering, based on the one or more homotopy parameters, agents of the plurality of agents.

Item 16. The method of any one of the previous Items, wherein an agent of the plurality of agents comprises an object capable of a dynamic movement over time.

Item 17. The method of any one of the previous Items, wherein the method comprises: operating, based on the trajectory, the autonomous vehicle.

Item 18. A non-transitory computer readable medium comprising instructions stored thereon that, when executed by at least one processor, cause the at least one processor to carry out operations comprising:
obtaining, by at least one processor, sensor data associated with an environment in which an autonomous vehicle is operating;
determining, by the at least one processor, based on the sensor data, an agent set comprising a plurality of agents located in the environment;
determining, by the at least one processor, for each agent of the agent set, an interaction parameter indicative of a prediction of interaction of the corresponding agent with the autonomous vehicle;
determining, by the at least one processor, based on the interaction parameters, a primary agent set, wherein the primary agent set is a subset of the agent set; and
generating, by the at least one processor, based on the primary agent set, a trajectory for the autonomous vehicle.

Item 19. The non-transitory computer readable medium of Item 18, wherein determining, based on the interaction parameters, the primary agent set comprises determining the primary agent set by filtering out one or more agents of the agent set based on the interaction parameters.

Item 20. The non-transitory computer readable medium of Items 18-19, wherein determining, based on the interaction parameters, the primary agent set comprises:
determining the primary agent set by applying, to the agent set, a prioritization scheme based on the interaction parameters.

Item 21. The non-transitory computer readable medium of any of Items 19-20, wherein the filtering or the prioritization scheme is based on a criterion applied to the interaction parameters.

Item 22. The non-transitory computer readable medium of Items 18-21, wherein generating, based on the primary agent set, the trajectory for the autonomous vehicle comprises applying a first model to an agent of the primary agent set.

Item 23. The non-transitory computer readable medium of Items 18-22, further comprising determining, by the at least one processor, based on the interaction parameters, a secondary agent set, wherein the primary agent set and the secondary agent set are mutually exclusive subsets of the agent set.

Item 24. The non-transitory computer readable medium of Item 23, wherein generating, based on the primary agent set, the trajectory for the autonomous vehicle comprises:
generating, based on the primary agent set and the secondary agent set, the trajectory for the autonomous vehicle.

Item 25. The non-transitory computer readable medium of any of Items 22-24, wherein generating, based on the primary agent set and the secondary agent set, a trajectory for the autonomous vehicle comprises:
applying a second model to one or more agents of the secondary agent set.

Item 26. The non-transitory computer readable medium of Item 25, wherein the first model has a higher fidelity than the second model.

Item 27. The non-transitory computer readable medium of any one of Items 25-26, wherein the first model or second model comprises one or more of: an agent recognition scheme, an agent prediction scheme, an agent projection scheme, a trajectory extraction scheme and a trajectory evaluation scheme.

Item 28. The non-transitory computer readable medium of Items 18-27, wherein determining, by the at least one processor, for each agent of the agent set, an interaction parameter indicative of a prediction of interaction of the corresponding agent with the autonomous vehicle comprises:
predicting an interaction of the corresponding agent with the autonomous vehicle; and
determining the interaction parameter based on the prediction.

Item 29. The non-transitory computer readable medium of Item 28, wherein predicting the interaction of the corresponding agent with the autonomous vehicle comprises:

determining, for each agent, one or more homotopy parameters indicative of a constraint applied by the agent on a trajectory of the autonomous vehicle; and predicting the interaction based on the one or more homotopy parameters.

Item 30. The non-transitory computer readable medium of Item 29, wherein predicting the interaction based on the one or more homotopy parameters comprises predicting the interaction by inputting the one or more homotopy parameters or sensor data into a neural network model.

Item 31. The non-transitory computer readable medium of Items 29-30, wherein the one or more homotopy parameters are indicative of one or more of: a speed of the agent, an acceleration of the agent, and a location of the agent.

Item 32. The non-transitory computer readable medium of Items 29-30, wherein the method comprises clustering, based on the one or more homotopy parameters, agents of the plurality of agents.

Item 33. The non-transitory computer readable medium of any one of Items 18-32, wherein an agent of the plurality of agents comprises an object capable of a dynamic movement over time.

Item 34. The non-transitory computer readable medium of any one of Items 18-32, wherein the method comprises: operating, based on the trajectory, the autonomous vehicle.

Item 35. A system, comprising at least one processor; and at least one memory storing instructions thereon that, when executed by the at least one processor, cause the at least one processor to:
   obtain sensor data associated with an environment in which an autonomous vehicle is operating;
   determine, based on the sensor data, an agent set comprising a plurality of agents located in the environment;
   determine, for each agent of the agent set, an interaction parameter indicative of a prediction of interaction of the corresponding agent with the autonomous vehicle;
   determine, based on the interaction parameters, a primary agent set, wherein the primary agent set is a subset of the agent set; and
   generate, based on the primary agent set, a trajectory for the autonomous vehicle.

Item 36. The system of Item 35, wherein to determine, based on the interaction parameters, the primary agent set comprises to determine the primary agent set by filtering out one or more agents of the agent set based on the interaction parameters.

Item 37. The system of any one of Items 35-36, wherein to determine, based on the interaction parameters, the primary agent set comprises:
   to determine the primary agent set by applying, to the agent set, a prioritization scheme based on the interaction parameters.

Item 38. The system of any one of Items 36-37, wherein the filtering or the prioritization scheme is based on a criterion applied to the interaction parameters.

Item 39. The system of any one of Items 35-38, wherein to generate, based on the primary agent set, the trajectory for the autonomous vehicle comprises applying a first model to an agent of the primary agent set.

Item 40. The system of any one of Items 35-39, further comprising to determine, by the at least one processor, based on the interaction parameters, a secondary agent set, wherein the primary agent set and the secondary agent set are mutually exclusive subsets of the agent set.

Item 41. The system of Item 40, wherein to generate, based on the primary agent set, the trajectory for the autonomous vehicle comprises:
   to generate, based on the primary agent set and the secondary agent set, the trajectory for the autonomous vehicle.

Item 42. The system of any of Items 39-41, wherein to generate, based on the primary agent set and the secondary agent set, a trajectory for the autonomous vehicle comprises:
   to apply a second model to one or more agents of the secondary agent set.

Item 43. The system of Item 42, wherein the first model has a higher fidelity than the second model.

Item 44. The system of any one of Items 42-43, wherein the first model or second model comprises one or more of: an agent recognition scheme, an agent prediction scheme, an agent projection scheme, a trajectory extraction scheme and a trajectory evaluation scheme.

Item 45. The system of any one of Items 35-44, wherein to determine, by the at least one processor, for each agent of the agent set, an interaction parameter indicative of a prediction of interaction of the corresponding agent with the autonomous vehicle comprises:
   to predict an interaction of the corresponding agent with the autonomous vehicle; and
   to determine the interaction parameter based on the prediction.

Item 46. The system of Item 45, wherein to predict the interaction of the corresponding agent with the autonomous vehicle comprises:
   to determine, for each agent, one or more homotopy parameters indicative of a constraint applied by the agent on a trajectory of the autonomous vehicle; and
   to predict the interaction based on the one or more homotopy parameters.

Item 47. The system of Item 46, wherein to predict the interaction based on the one or more homotopy parameters comprises predicting the interaction by inputting the one or more homotopy parameters or sensor data into a neural network model.

Item 48. The system of Items 45-47, wherein the one or more homotopy parameters are indicative of one or more of: a speed of the agent, an acceleration of the agent, and a location of the agent.

Item 49. The system of any one of Items 45-47, wherein the system causes the at least one processor to cluster, based on the one or more homotopy parameters, agents of the plurality of agents.

Item 50. The system of any one of Items 35-49, wherein an agent of the plurality of agents comprises an object capable of a dynamic movement over time.

Item 51. The system of any one of Items 35-50, wherein the system causes the at least one processor to operate, based on the trajectory, the autonomous vehicle.

Item 52. A method for operating an autonomous vehicle, the method comprising:
   obtaining, by at least one processor, sensor data associated with an environment in which an autonomous vehicle is operating,
   determining, by the at least one processor, based on the sensor data, an agent set comprising a plurality of agents located in the environment;
   determining, by the at least one processor, a primary agent set by applying, to the agent set, a prioritization scheme based on the sensor data; and
   generating, by the at least one processor, based on the primary agent set, a trajectory for the autonomous vehicle.

What is claimed is:

1. A method for operating an autonomous vehicle, the method comprising:
   obtaining, by at least one processor, sensor data associated with an environment in which an autonomous vehicle is operating;
   determining, by the at least one processor, based on the sensor data, an agent set comprising a plurality of agents located in the environment;
   determining, by the at least one processor, for each agent of the agent set, an interaction parameter indicative of a prediction of interaction of the respective agent with the autonomous vehicle;
   determining, by the at least one processor, based on the plurality of interaction parameters, a primary agent set, wherein the primary agent set comprises a plurality of primary agents, the plurality of primary agents corresponding to a subset of the plurality of agents of the agent set;
   ordering, by the at least one processor, the plurality of primary agents of the primary agent set based on a size of one or more homotopies;
   generating, by the at least one processor, based on the ordered plurality of primary agents of the primary agent set, a trajectory for the autonomous vehicle; and
   providing, based on the trajectory, control data to cause operation of the autonomous vehicle.

2. The method of claim 1, wherein determining, based on the plurality of interaction parameters, the primary agent set comprises filtering out one or more agents of the agent set based on the plurality of interaction parameters.

3. The method of claim 2, wherein filtering out one or more agents comprises filtering out one or more agents based on a criterion applied to the plurality of interaction parameters.

4. The method of claim 1, wherein determining, based on the plurality of interaction parameters, the primary agent set comprises:
   applying, to the agent set, a prioritization scheme based on the plurality of interaction parameters.

5. The method of claim 1, wherein generating, based on the primary agent set, the trajectory for the autonomous vehicle comprises applying a first model to an agent of the primary agent set.

6. The method of claim 5, further comprising determining, by the at least one processor, based on the plurality of interaction parameters, a secondary agent set, wherein the primary agent set and the secondary agent set are mutually exclusive subsets of the agent set.

7. The method of claim 6, wherein generating, based on the primary agent set, the trajectory for the autonomous vehicle comprises:
   generating, based on the primary agent set and the secondary agent set, the trajectory for the autonomous vehicle.

8. The method of claim 5, wherein generating, based on the primary agent set and the secondary agent set, a trajectory for the autonomous vehicle comprises:
   applying a second model to one or more agents of the secondary agent set.

9. The method of claim 8, wherein the first model has a higher fidelity than the second model.

10. The method of claim 8, wherein the first model or second model comprises one or more of: an agent recognition scheme, an agent prediction scheme, an agent projection scheme, a trajectory extraction scheme and a trajectory evaluation scheme.

11. The method of claim 1, wherein determining, by the at least one processor, for each agent of the agent set, an interaction parameter indicative of a prediction of interaction of the respective agent with the autonomous vehicle comprises:
   predicting an interaction of the respective agent with the autonomous vehicle; and
   determining the interaction parameter based on the prediction.

12. The method of claim 11, wherein predicting the interaction of the respective agent with the autonomous vehicle comprises:
   determining one or more homotopy parameters indicative of a constraint applied by the respective agent on a trajectory of the autonomous vehicle; and
   predicting the interaction based on the one or more homotopy parameters.

13. The method of claim 12, wherein predicting the interaction based on the one or more homotopy parameters comprises predicting the interaction by inputting the one or more homotopy parameters or sensor data into a neural network model.

14. The method of claim 12, wherein the one or more homotopy parameters are indicative of at least one of: a speed of the respective agent, an acceleration of the respective agent, or a location of the respective agent.

15. The method of claim 12, wherein the method comprises clustering, based on the one or more homotopy parameters, agents of the plurality of agents.

16. The method of claim 1, wherein an agent of the plurality of agents comprises an object capable of a dynamic movement over time.

17. The method of claim 1, wherein the method comprises: operating, based on the trajectory, the autonomous vehicle.

18. A non-transitory computer readable medium comprising computer-executable instructions stored thereon that, when executed by at least one processor, cause the at least one processor to carry out operations comprising:
   obtaining, by at least one processor, sensor data associated with an environment in which an autonomous vehicle is operating;
   determining, by the at least one processor, based on the sensor data, an agent set comprising a plurality of agents located in the environment;
   determining, by the at least one processor, for each agent of the agent set, an interaction parameter indicative of a prediction of interaction of the respective agent with the autonomous vehicle;
   determining, by the at least one processor, based on the plurality of interaction parameters, a primary agent set, wherein the primary agent set comprises a plurality of primary agents, the plurality of primary agents corresponding to i-s-a subset of the plurality of agents of the agent set;
   ordering, by the at least one processor, the plurality of primary agents of the primary agent set based on a size of one or more homotopies,
   generating, by the at least one processor, based on the ordered plurality of primary agents of the primary agent set, a trajectory for the autonomous vehicle; and
   providing, based on the trajectory, control data to cause operation of the autonomous vehicle.

19. A system, comprising at least one processor; and at least one memory storing computer-executable instructions thereon that, when executed by the at least one processor, cause the at least one processor to:

obtain sensor data associated with an environment in which an autonomous vehicle is operating;

determine, based on the sensor data, an agent set comprising a plurality of agents located in the environment;

determine, for each agent of the agent set, an interaction parameter indicative of a prediction of interaction of the respective agent with the autonomous vehicle;

determine, based on the plurality of interaction parameters, a primary agent set, wherein the primary agent set comprises a plurality of primary agents, the plurality of primary agents corresponding to a subset of the plurality of agents of the agent set;

order the plurality of primary agents of the primary agent set based on a size of one or more homotopies;

generate, based on the ordered plurality of primary agents of the primary agent set, a trajectory for the autonomous vehicle, and provide, based on the trajectory, control data to cause operation of the autonomous vehicle.

20. The system of claim 19, wherein to determine, based on the plurality of interaction parameters, the primary agent set, the computer-executable instructions cause the at least one processor to filter out one or more agents of the agent set based on the plurality of interaction parameters.

21. The system of claim 19, wherein to determine, based on the plurality of interaction parameters, the primary agent, the computer-executable instructions cause the at least one processor to determine the primary agent set by applying, to the agent set, a prioritization scheme based on the plurality of interaction parameters.

22. The system of claim 19, wherein to generate, based on the primary agent set, the trajectory for the autonomous vehicle, the computer-executable instructions cause the at least one processor to apply a first model to an agent of the primary agent set.

23. The system of claim 22, wherein the computer-executable instructions further cause the at least one processor to: determine, based on the plurality of interaction parameters, a secondary agent set, wherein the primary agent set and the secondary agent set are mutually exclusive subsets of the agent set.

24. The system of claim 23, wherein to generate, based on the primary agent set, the trajectory for the autonomous vehicle, the computer-executable instructions cause the at least one processor to generate, based on the primary agent set and the secondary agent set, the trajectory for the autonomous vehicle.

25. The system of claim 23, wherein to generate, based on the primary agent set and the secondary agent set, a trajectory for the autonomous vehicle, the computer-executable instructions cause the at least one processor to apply a second model to one or more agents of the secondary agent set.

26. The system of claim 25, wherein the first model is associated with a first fidelity and the second model is associated with a second fidelity and wherein the first fidelity is higher than the second fidelity.

27. The system of claim 19, wherein to determine, by the at least one processor, for each agent of the agent set, an interaction parameter indicative of a prediction of interaction of the respective agent with the autonomous vehicle, the computer-executable instructions cause the at least one processor to:
predict an interaction of the respective agent with the autonomous vehicle; and
determine the interaction parameter based on the prediction.

28. The system of claim 27, wherein to predict the interaction of the respective agent with the autonomous vehicle, the computer-executable instructions cause the at least one processor to:
determine, for each agent, one or more homotopy parameters indicative of a constraint applied by the agent on a trajectory of the autonomous vehicle; and
predict the interaction based on the one or more homotopy parameters.

29. The system of claim 19, wherein the computer-executable instructions further cause the at least one processor to cause the at least one processor to operate based on the trajectory the autonomous vehicle.

30. A method for operating an autonomous vehicle, the method comprising:
obtaining, by at least one processor, sensor data associated with an environment in which an autonomous vehicle is operating,
determining, by the at least one processor, based on the sensor data, an agent set comprising a plurality of agents located in the environment;
determining, by the at least one processor, a primary agent set by applying, to the agent set, a prioritization scheme based on the sensor data, wherein the primary agent set comprises a plurality of primary agents, the plurality of primary agents corresponding to a subset of the plurality of agents of the agent set;
ordering the plurality of primary agents of the primary agent set based on a size of one or more homotopies;
generating, by the at least one processor, based on the ordered plurality of primary agents of the primary agent set, a trajectory for the autonomous vehicle; and
providing, based on the trajectory, control data to cause operation of the autonomous vehicle.

* * * * *

UNITED STATES PATENT AND TRADEMARK OFFICE
CERTIFICATE OF CORRECTION

| | |
|---|---|
| PATENT NO. | : 12,050,468 B2 |
| APPLICATION NO. | : 18/160456 |
| DATED | : July 30, 2024 |
| INVENTOR(S) | : Bence Cserna et al. |

It is certified that error appears in the above-identified patent and that said Letters Patent is hereby corrected as shown below:

In the Specification

Column 2, Line 46, delete "ad/or" and insert -- and/or --.

Column 8, Line 41, delete "spectrum" and insert -- spectrum. --.

In the Claims

Column 39, Line 56, Claim 8, delete "claim 5," and insert -- claim 6, --.

Column 40, Line 22, Claim 13, delete "network model." and insert -- network. --.

Column 40, Line 54, Claim 18, delete "i-s-a" and insert -- a --.

Column 40, Line 58, Claim 18, delete "homotopies," and insert -- homotopies; --.

Page 1 of 1

Signed and Sealed this
Nineteenth Day of November, 2024

Katherine Kelly Vidal
*Director of the United States Patent and Trademark Office*